(12) United States Patent
Iraqi et al.

(10) Patent No.: US 11,530,330 B2
(45) Date of Patent: Dec. 20, 2022

(54) INKJET PRINTING ON DYED SYNTHETIC FABRICS

(71) Applicant: Kornit Digital Ltd., Rosh HaAyin (IL)

(72) Inventors: Muhammad Iraqi, Tira (IL); Jacob Mozel, Kfar-Saba (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 16/480,682

(22) PCT Filed: Jan. 23, 2018

(86) PCT No.: PCT/IL2018/050084
§ 371 (c)(1),
(2) Date: Jul. 25, 2019

(87) PCT Pub. No.: WO2018/138720
PCT Pub. Date: Aug. 2, 2018

(65) Prior Publication Data
US 2019/0382606 A1 Dec. 19, 2019

Related U.S. Application Data

(60) Provisional application No. 62/450,146, filed on Jan. 25, 2017.

(51) Int. Cl.
| | |
|---|---|
| *C09D 11/32* | (2014.01) |
| *C09D 11/40* | (2014.01) |
| *D06P 5/22* | (2006.01) |
| *C09D 11/102* | (2014.01) |
| *B41J 3/407* | (2006.01) |
| *D06P 5/30* | (2006.01) |
| *B41M 5/00* | (2006.01) |

(52) U.S. Cl.
CPC ............ *C09D 11/32* (2013.01); *C09D 11/102* (2013.01); *C09D 11/40* (2013.01); *D06P 5/22* (2013.01); *B41J 3/4078* (2013.01); *B41M 5/0017* (2013.01); *D06P 5/30* (2013.01)

(58) Field of Classification Search
CPC ....... C09D 11/32; C09D 11/40; C09D 11/102; D06P 5/22; D06P 5/30; B41J 3/4078; B41M 5/0017
See application file for complete search history.

(56) References Cited

U.S. PATENT DOCUMENTS

| | | | |
|---|---|---|---|
| 3,898,197 A * | 8/1975 | Guise | C08G 18/10 528/59 |
| 6,124,398 A | 9/2000 | Imashiro et al. | |
| 7,425,062 B2 * | 9/2008 | Bauer | C09D 11/30 347/100 |
| 7,530,683 B2 | 5/2009 | Bauer | |
| 8,186,822 B2 | 5/2012 | Li et al. | |
| 8,436,084 B2 | 5/2013 | Kawaguchi et al. | |
| 8,556,411 B2 | 10/2013 | Niu | |
| 8,563,634 B2 | 10/2013 | Deiner et al. | |
| 8,604,154 B2 | 12/2013 | Takahashi et al. | |
| 9,255,207 B2 | 2/2016 | Berge et al. | |
| 9,382,435 B2 | 7/2016 | Berge et al. | |
| 9,771,488 B2 | 9/2017 | Hong et al. | |
| 2006/0148980 A1 | 7/2006 | Tielemans et al. | |
| 2008/0171149 A1 * | 7/2008 | Hastie | D06P 5/30 427/288 |
| 2011/0032304 A1 | 2/2011 | Mozel et al. | |
| 2013/0085217 A1 | 4/2013 | Iu et al. | |
| 2014/0210901 A1 | 7/2014 | Ohashi et al. | |
| 2015/0116419 A1 | 4/2015 | Oura et al. | |
| 2015/0166807 A1 * | 6/2015 | Komatsu | C08K 5/053 347/20 |
| 2015/0284905 A1 | 10/2015 | Mozel | |
| 2016/0060810 A1 | 3/2016 | Saito et al. | |
| 2016/0200858 A1 | 7/2016 | Fukuda et al. | |
| 2016/0207329 A1 | 7/2016 | Mann et al. | |

FOREIGN PATENT DOCUMENTS

| | | |
|---|---|---|
| CN | 1733851 | 2/2006 |
| CN | 102408496 | 4/2012 |
| CN | 104231285 | 12/2014 |
| CN | 106567267 | 4/2017 |
| EP | 0277361 | 8/1988 |
| EP | 2679641 | 8/2013 |
| JP | 11-152424 | 6/1999 |
| JP | 2008-266527 | 11/2008 |
| JP | 2011-189527 | 9/2011 |
| JP | 2014-148564 | 8/2014 |
| JP | 2016-050277 | 4/2016 |

(Continued)

OTHER PUBLICATIONS

Notification of Office Action and Search Report dated Jun. 23, 2020 From the State Intellectual Property Office of the People's Republic of China Re. Application No. 201880017812.3. (6 Pages).

(Continued)

*Primary Examiner* — Patrick D Niland

(57) ABSTRACT

An inkset and a process for direct inkjet printing color images on dyed synthetic fabrics is provided herewith, based on forming an image on the fabric in the form of a well-adhered crosslinked film, using an acid-immobilized ink composition, while avoiding dye migration from the fabric to the image in the process of curing the film, using a low-temperature curing crosslinking agent and curing the image at a temperature lower than 120±5° C.

4 Claims, 1 Drawing Sheet

(56) References Cited

FOREIGN PATENT DOCUMENTS

| JP | 2015-19378 | 5/2016 |
|---|---|---|
| JP | 2016-124213 | 7/2016 |
| JP | 2018-053170 | 4/2018 |
| WO | WO 2009/001589 | 8/2008 |
| WO | WO 2015/130498 | 9/2015 |
| WO | WO 2018/138720 | 8/2018 |

OTHER PUBLICATIONS

International Preliminary Report on Patentability dated Aug. 8, 2019 From the International Bureau of WIPO Re. Application No. IL2018/050084. (9 Pages).
International Search Report and the Written Opinion dated Mar. 27, 2018 From the International Searching Authority Re. Application No. IL2018/050084. (13 Pages).
Coudray "Minimizing Sublimation Dye Migration. How to Successfully Print on 50/50 Cotton/Poly Blended Fleece Without Experiencing Bleeding", Impressions Tech Tips, Impressions Newsletter, 4 P., Sep. 2013.
Derksen "Polycarbodiimides as Classification-Free and Easy to Use Crosslinkers for Water-Based Coatings", Stahl International, White Paper, 6 P., Sep. 19, 2016.
Hesselmans et al. "Polycarbodiimide Crosslinkers", Progress in Organic Coatings, 55(2): 142-148, Feb. 2006.
Posthumus et al. "Crosslinking by Polycarbodiimides", Progress in Organic Coatings, 58(2): 231-236, Feb. 1, 2007.
Translation Dated Jul. 16, 2020 of Notification of Office Action dated Jun. 23, 2020 From the State Intellectual Property Office of the People's Republic of China Re. Application No. 201880017812.3. (3 Pages).
State Intellectual Property Office of the People's Republic of China Re. Application No. 201880017812.3. (3 Pages).
Translation Dated Jan. 28, 2021 of Notification of Office Action dated Jan. 11, 2021 From the State Intellectual Property Office of the People's Republic of China Re. Application No. 201880017812.3. (1 Page).
Supplementary European Search Report and the European Search Opinion dated Jan. 22, 2021 From the European Patent Office Re. Application No. 18745102.6. (11 Pages).
Supplementary Partial European Search Report and the European Provisional Opinion dated Oct. 9, 2020 From the European Patent Office Re. Application No. 18745102.6. (13 Pages).
State Intellectual Property Office of the People's Republic of China Re. Application No. 201880017812.3. (7 Pages).
Translation Dated Jun. 27, 2021 of Notification of Office Action dated Jun. 4, 2021 From the State Intellectual Property Office of the People's Republic of China Re. Application No. 201880017812.3. (4 Pages).
Notice of Reason(s) for Rejection Dated Jul. 30, 2021 From the Japan Patent Office Re. Application No. 2019-540456 and Its Translation Into English. (11 Pages).
Notice of Reasons for Rejection dated Mar. 1, 2022 From the Japan Patent Office Re. Application No. 2014-513308 together with a machine translation into English. ( 2 Page).
Relatório de Busca e Parecer [Search Report and Opinion] Dated Jul. 21, 2022 From the Serviço Público Federal, Ministério da Economia, Instituto National da Propriedade Industrial do Brasil Re. Application No. BR112019015281-4. (4 Pages).
English Translation Dated Aug. 18, 2022 of Relatório de Busca e Parecer [Search Report and Opinion] dated Jul. 21, 2022 From the Serviço Público Federal, Ministério da Economia, Instituto Nacional da Propriedade Industrial do Brasil Re Application No. BRI 12019015281-4. (4 Pages).

* cited by examiner

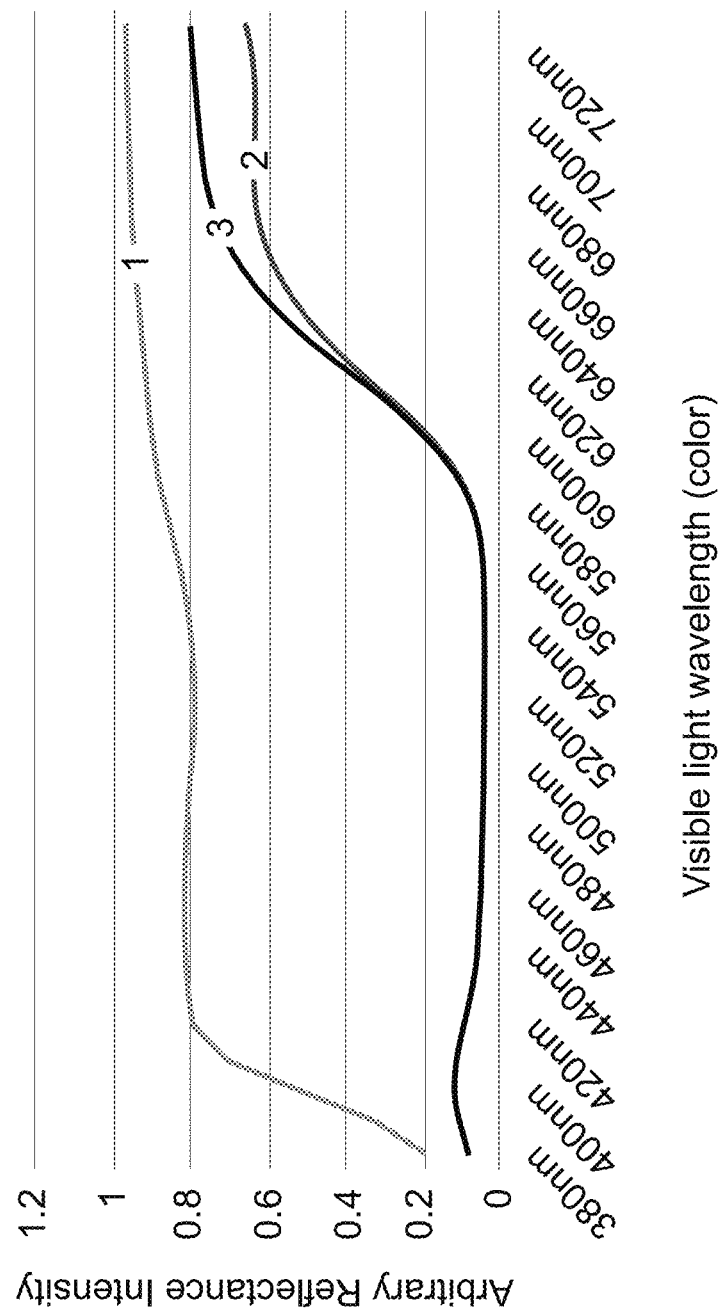

INKJET PRINTING ON DYED SYNTHETIC FABRICS

RELATED APPLICATIONS

This application is a National Phase of PCT Patent Application No. PCT/IL2018/050084 having International filing date of Jan. 23, 2018, which claims the benefit of priority under 35 USC § 119(e) of U.S. Provisional Patent Application No. 62/450,146 filed on Jan. 25, 2017. The contents of the above applications are all incorporated by reference as if fully set forth herein in their entirety.

FIELD AND BACKGROUND OF THE INVENTION

The present invention, in some embodiments thereof, relates to inkjet printing technology and, more particularly, but not exclusively, to processes and compositions for direct inkjet printing on untreated dyed synthetic fabrics.

Inkjet printing on fabrics typically involves forming a film on the surface of the substrate such that the colorant (pigment and/or dye) is embedded in the film and the film is affixed to the substrate, giving the finished product wash-fastness and durability. Adherence of the film is typically achieved by forming bonds between functional groups in the substrate and corresponding functional groups in the material of the film; the film comprises binders and adhesion promoting agents, collectively referred to herein as film-forming agents, which form the film with when crosslinked with a crosslinking agent upon exposing the mixture to heat or other forms of energy; a step of the printing process referred to curing.

Problems associated with inkjet printing liquid inks directly on absorptive substrates, such as textile and garments, have been mitigated in U.S. Patent Application Publication No. 20150152274, and PCT Application Nos. WO 2005/115089 and WO 2005/115761, by the present assignee, and which are incorporated by reference as if fully set forth herein. These documents teach a process, a composition and an apparatus for printing an image on an absorptive surface, such as an untreated (a substrate that has not been pre-treated chemically) textile piece, that includes applying a wetting composition on the surface which is capable of interfering with the engagement of a liquid ink composition with the binding sites of the surface. According to the processes taught in these patent applications, once the wetting composition is applied, the liquid ink composition is applied while the surface is still wet. Using this process, a vivid color image is formed on the absorptive surface. These patent applications, however, fail to address printing a color image on an absorptive dark surface.

Multi-part ink compositions, which are based on contacting an immobilizing composition and a colored ink composition on the surface of an untreated substrate, so as to congeal the colored ink composition on the substrate, thereby minimizing feathering and soaking thereof into absorptive substrates, are also taught in U.S. patent application Ser. No. 11/588,277 (U.S. Patent Application Publication No. 20070104899), and U.S. patent application Ser. No. 11/606,242 (U.S. Patent Application Publication No. 20070103529), all of which are incorporated by reference as if fully set forth herein.

Problems associated with inkjet printing transparent liquid inks directly on dark substrates, such as dyed textile and garments, have been mitigated in U.S. Pat. No. 7,134,749, by the present assignee, which is incorporated by reference as if fully set forth herein. This document teaches a method and an apparatus for color printing on an untreated dark textile piece which includes digitally printing, by means of an inkjet printer head, an opaque white ink layer directly onto the untreated dark textile piece, and digitally printing a colored image on the white ink layer.

U.S. Pat. No. 8,540,358, by the present assignee, which is incorporated by reference as if fully set forth herein, teaches an inkjet ink compositions for forming an image in a form of an elastic film attached to a surface of an untreated stretchable and/or flexible substrate and processes utilizing same for inkjet printing color images on various substrates such as colored and absorptive or impregnable stretchable materials, which are characterized by heightened efficiency in process time, ink and energy consumption, as well as products having durable, wash-fast and abrasion-fast images printed thereon by the process, are disclosed.

Direct inkjet printing of pigments on untreated fabrics has enjoyed the improvements provided by the aforementioned technologies, since the emulsified and suspended pigment particles are required to be bound to the substrate by means of film-forming agents (adhesion agents and/or binders), forming a transparent film that encapsulates the pigment particles while adhering to the substrate, and in cases where the substrate is not white, the process is supplemented by an opaque white base layer. The aforementioned technologies employed the presence of emulsified film-forming adhesion agents and film-forming binders and/or dispersants of the suspended pigment particles, by utilizing property-sensitive variants of these ingredients, wherein these ingredients tend to lose their solubility in the ink's medium, and thereby cause coagulation of the ink composition when contacting with a property-adjusting agent (e.g., an acid) on the surface of the substrate. In addition, the aforementioned technologies are based on the ability to crosslink the various ingredients of the film amongst themselves and with the substrate, which is obtained by using a crosslinking agent which cures the film at elevated temperatures.

The requirement to form a well-adhered transparent film to the substrate by crosslinking rises a problem when attempting to inkjet-print images on dyed substrates, particularly synthetic fabrics, wherein the dye in the substrate is of the typical type that becomes loose under elevated temperatures, and prone to migrate. This problem, known as dye migration, renders the colors of the image tinted with the color of the substrate, since the dye migrates during the curing step, and infiltrates the freshly printed film (image). In case where the image printing process is supplemented with an opaque white underbase later, the white underbase becomes tinted with the dye migrating from the substrate therein, skewing the colors that are printed on top of it.

Attempts to minimize the problem of dye migration into inkjet-printed and heat-cured images on dyed substrates include pretreatment of the substrate with substances that allegedly limit dye migration upon heating the substrate to effect curing of the image; however, these pretreatments pose a commercial burden and limit the scope of fabrics that can be used, and provide a marginal solution to the problem.

Attempts to block dye-migration in printing onto colored synthetic fiber included the use of activated carbon as an active ingredient of a transfer paper comprising a resin layer containing the activated carbon to block dyes in the synthetic fiber from migration.

Low-bleed inks have been designed to minimize dye migration, however, no ink can stop dye from sublimating at elevated temperatures. Low-bleed inks contain chemical-blocking agents that are selected to mitigate migration;

however, since the ratio of sublimated dye to chemical-blocking agents in the ink is so great, the dye simply overpowers the ink's ability to block its migration.

Other attempts include using UV-curable inks; however, such inks are less adapted for printing on synthetic substrates, heat-migrating of dyes is most pronounced. Using other rapid-acting crosslinking agent, such as aziridine and/or isocyanate is not possible due to safety, health and stability issues.

Low-temperature curing crosslinking agent (LTCC) have been suggested for use in inkjet printing; however, these agent were chosen for their ability to disperse as colloids and latex suspensions in water and cure under alkaline conditions at about 120° C.

SUMMARY OF THE INVENTION

The present invention provides a compositions and processes for inkjet printing a color image on a dyed synthetic fabric, such that the printed ink is not soaked into the fabric during the printing step, and the dye in the substrate does not migrate into and distort the colors of the printed image during the curing step. These two feats are achieved by applying an immobilizing composition to the fabric that causes the ink composition to coagulate upon contact due to its low pH, and at the same time deliver a low-temperature curing crosslinking agent to the ink composition that affixes the image film to the substrate while avoiding heating it to dye-migration temperatures.

Thus, according to an aspect of some embodiments of the present invention there is provided an inkset that includes an immobilizing composition and at least one ink composition, the ink composition includes a dispersed pigment and/or dye, a low-temperature curing self-crosslinking resin and an aqueous carrier, and formulated to exhibit an alkaline pH higher than 7, the immobilizing composition includes an acid and an aqueous carrier, and formulated to exhibit an acidic pH lower than 7, the inkset is for digital inkjet printing color images directly on a dyed substrate.

In some embodiments of the present invention, the substrate is dyed with a migratable dye.

According to some embodiments of the invention, the acidic pH is lower than 6.5.

According to some embodiments of the invention, the immobilizing composition is essentially devoid of a crosslinking agent.

According to some embodiments of the invention, the ink composition is essentially devoid of an additional crosslinking agent other than the low-temperature curing self-crosslinking resin.

According to some embodiments of the invention, the ink composition is essentially devoid of an additional film-forming agent and/or binder other than the low-temperature curing self-crosslinking resin.

According to some embodiments of the invention, the low-temperature curing self-crosslinking resin initiates crosslinking reaction at a temperature lower than 120° C., or lower than 110° C., or lower than 90° C., or that ranges from 90° C. to 110° C.

According to some embodiments of the invention, the low-temperature curing self-crosslinking resin initiates crosslinking reaction upon contacting an acid.

According to some embodiments of the invention, the low-temperature curing self-crosslinking resin is a low-$T_g$ low-temperature curing self-crosslinking resin.

According to some embodiments of the invention, the low-temperature curing self-crosslinking resin is a pH-sensitive low-temperature curing self-crosslinking resin.

According to some embodiments of the invention, the low-$T_g$ low-temperature curing self-crosslinking resin is a low-$T_g$ pH-sensitive low-temperature curing self-crosslinking resin.

According to some embodiments of the invention, the low-$T_g$ pH-sensitive low-temperature curing self-crosslinking resin is a polyurethane resin exhibiting self-crosslinking pendant groups and/or self-crosslinking end-capping groups.

According to some embodiments of the invention, the self-crosslinking pendant groups and/or the self-crosslinking end-capping groups includes silanol groups.

According to some embodiments of the invention, the acid is an organic acid.

According to some embodiments of the invention, the organic acid is volatile and/or decomposes at a temperature higher than 70° C.

According to some embodiments of the invention, the acid is selected form the group consisting of glycolic acid, acetic acid, lactic acid, malic acid, ascorbic acid, maleic acid and benzoic acid.

According to some embodiments of the invention, the substrate is a fabric that includes dyed synthetic fibers.

According to some embodiments of the invention, the dye in the dyed synthetic fibers migrates at a temperature higher than 120° C.

According to some embodiments of the invention, the dyed substrate is an untreated substrate.

According to an aspect of some embodiments of the present invention there is provided an inkset for digital inkjet printing color images directly on a dyed substrate; the inkset includes an immobilizing composition and at least one ink composition, the immobilizing composition includes a low-temperature curing crosslinking (LTCC) agent and a first carrier, and formulated to exhibit a pH lower than 7, whereas the ink composition includes a dispersed pigment and/or dye, an alkali-soluble agent, a high acid number film-forming agent and a second carrier. The inkset provided herein is particularly useful for digital inkjet printing color images on colored synthetic fabrics that are dyed with a migratable dye, and more particularly useful for digital inkjet printing color images on darkly colored synthetic fabrics that are dyed with a migratable dye that can sublime at high temperatures typically used for curing a digital ink composition such that the dye penetrates the printed image and distorts the colors of the image upon curing or thereafter.

According to some embodiments of the invention, the pH of the immobilizing composition is lower than 6.5.

According to some embodiments of the invention, the pH ranges from 4 to 6.5.

According to some embodiments of the invention, each of the immobilizing composition and the ink composition is substantially devoid of an aziridine and/or a small-molecule isocyanate.

According to some embodiments of the invention, the LTCC agent initiates crosslinking reaction at a temperature that ranges from 90° C. to 110° C.

According to some embodiments of the invention, the LTCC agent propagates crosslinking reaction at a temperature lower than 100° C.

According to some embodiments of the invention, the LTCC agent is a carbodiimide crosslinking agent.

According to some embodiments of the invention, the LTCC agent is a polycarbodiimide crosslinking agent.

According to some embodiments of the invention, the immobilizing composition includes an acid.

According to some embodiments of the invention, the acid is an organic acid.

According to some embodiments of the invention, the organic acid is volatile and/or decomposes at a temperature higher than 70° C.

According to some embodiments of the invention, the acid is selected form the group consisting of glycolic acid, acetic acid, lactic acid, malic acid, ascorbic acid, maleic acid and benzoic acid.

According to some embodiments of the invention, the first carrier includes water.

According to some embodiments of the invention, the first carrier includes water and a water-miscible organic solvent.

According to some embodiments of the invention, the ratio of water to organic solvent ranges from 100:1-1:1.

According to some embodiments of the invention, the water-miscible organic solvent is a glycol ether.

According to some embodiments of the invention, the glycol ether is selected from the group consisting of dipropylene glycol methyl ether, ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether and diethylene glycol mono-n-butyl ether.

According to some embodiments of the invention, the alkali-soluble agent is capable of coagulating upon contacting the acid.

According to some embodiments of the invention, the alkali-soluble agent is selected from the group consisting of an alkali-soluble resin, an alkali-soluble polymer, an alkali-soluble dispersant, an alkali-soluble surfactant, an alkali-soluble coagulant and an alkali-soluble gelling agent.

According to some embodiments of the invention, the alkali-soluble agent is an alkali-soluble polymer.

According to some embodiments of the invention, the alkali-soluble polymer is selected from the group consisting of an alkali-soluble acrylic polymer, an alkali-soluble co-acrylic polymer, poly(styrene/acrylic acid) polymer, an emulsified polyurethane, a polyurethane polymer, a polyether polymer, a polyester polymer, a polyacrylate polymer, a polyvinyl chloride polymer, a polyvinyl acetate polymer, a polyvinyl butyral polymer, an aminosilicon polymer and any salt, co-polymer or combination thereof.

According to some embodiments of the invention, the acid number of the high acid number film-forming agent is greater than 5, 7, 10, 15, 20 or 30 mg KOH/gram.

According to some embodiments of the invention, the high acid number film-forming agent includes a plurality of carboxylic groups.

According to some embodiments of the invention, the high acid number film-forming agent is selected from the group consisting of polyacrylic acid, acidic alkoxylated polymer, poly(2-acrylamido-2-methylpropanesulphonic acid), poly(acrylic acid-co-maleic acid), poly(butadiene-co-maleic acid), poly(ethylene-co-acrylic acid), polymaleic acid, poly(methacrylic acid), poly(4-styrenesulfonic acid-co-maleic acid), and any salt thereof, any mixture thereof, any co-polymer and/or combination thereof.

According to some embodiments of the invention, the second carrier is an aqueous carrier.

According to some embodiments of the invention, the dyed substrate is a fabric that includes dyed synthetic fibers.

According to some embodiments of the invention, the synthetic fibers are selected from the group consisting of polyester fibers, polyurethane fibers, polyamide fibers, polyacryl fibers, polyolefin fibers, polybenzimidazole fibers, and any co-polymer thereof, Nylon fibers, polyacrylonitrile (Modacryl) fibers, Rayon fibers, Vinyon fibers, Saran fibers, Spandex fibers, Vinalon fibers, Aramid fibers, Modal® fibers, Dyneema® fibers and Spectra® fibers, and combination thereof with cellulosic fibers and/or animal fibers, and combination of the foregoing.

According to some embodiments of the invention, the dyed substrate includes a sublimable and/or migratable dye.

According to some embodiments of the invention, the sublimable and/or migratable dye migrates at a temperature higher than 120° C.

According to some embodiments of the invention, the dyed substrate is an untreated dyed substrate; namely not pre-treated off-line of the printing process, to limit dye migration.

According to some embodiments of the invention, the dispersed pigment is selected from the group consisting of a white pigment, a black pigment, a yellow pigment, a cyan pigment, a magenta pigment, a blue pigment, a green pigment, a red pigment, and any combination thereof.

According to an aspect of some embodiments of the present invention there is provided a process for digital inkjet printing color images directly on a dyed substrate using the inkset presented herein, the process includes:

contacting at least a portion of the substrate with the immobilizing composition;

printing the ink composition directly on the portion of the substrate; and heating the substrate to a temperature lower than 110±5° C. to thereby initiate a crosslinking reaction and form the image in the form of a film on the surface of the substrate.

According to some embodiments of the invention, the process further includes, subsequent to heating, maintaining the substrate having the printed thereon at a temperature lower than 100° C. for a time period that ranges from 1 hour to 1 week to thereby effect propagation of the crosslinking reaction. In some embodiments, the time period is shorted than one hour or longer than one week, or can be any length between 0 to 7 days.

According to some embodiments of the invention, the temperature lower than 100° C. is room temperature.

According to an aspect of some embodiments of the present invention, there is provided a dyed substrate having an image printed thereon in a form of a cured film, wherein the image is afforded by inkjet printing the inkset provided herein on the surface of the substrate.

According to an aspect of some embodiments of the present invention, there is provided an image in a form of a cured film applied on a dyed substrate, wherein the image is afforded by the process provided herein.

According to some embodiments of the invention, the dyed substrate is dyed with a migratable dye, and the cured film is essentially devoid of the migratable dye.

According to some embodiments of the invention, the cured film is essentially devoid of a residue of a crosslinking agent other than the pH-sensitive low-temperature curing self-crosslinking resin, or the low-temperature curing crosslinking agent.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 presents a comparative plot of reflectance measured by a colorimeter wavelength scan in the visible light range, obtained from a sample of a white image printed on a red polyester fabric using acidic immobilizing composition that includes a LTCC according to embodiments of the present invention (line No. 1), a neutral LTCC composition (line No. 2), and an alkaline (pH>9) LTCC composition (line No. 3).

DESCRIPTION OF SOME SPECIFIC EMBODIMENTS OF THE INVENTION

The present invention, in some embodiments thereof, relates to inkjet printing technology and, more particularly, but not exclusively, to processes and compositions for direct inkjet printing on untreated dyed synthetic fabrics.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As mentioned hereinabove, currently used inkjet printing technologies are not suitable for direct inkjet printing on untreated dyed synthetic fabrics, particularly on dyed absorptive substrates such as darkly-dyed polyester fabrics, due to soaking, bleeding and spreading of the jetted ink droplets on and into the substrate, the subsequent feathering of the ink prior to the formation of a film, and the migration of the substrate's dye into the film (printed image) during the heat-driven curing step of the printing process.

While the aforementioned state of the art teaches the use of moderately low-temperature curing crosslinking agents in inkjet printing, the art could not provide a comprehensive solution to the aforementioned problems, particularly since the art is drawn to solutions of paper printing, and/or due to the still relatively high temperature required for curing, and/or the inability to achieve the combined result of no ink bleeding, no dye migration, and strong substrate adhesion.

The present inventor has contemplated a comprehensive solution for direct inkjet printing color images on darkly dyed untreated fabrics, which involves the use of low-temperature curing crosslinking agent (LTCC) that combines several properties, some of which contravene with one another. For example, the crosslinking agent should have the capacity to chemically interact with carboxylic groups in the film-forming agents of the ink composition and the substrate at temperatures lower than dye-migration temperatures, be sufficiently soluble and stable in acidic aqueous media without interacting chemically with carboxylic groups in the acidic aqueous media (have workable pot-life), and be suitable for inkjet machinery and work environment. In addition, the reactivity of the film-forming agents of the ink composition should match the reactivity of the LTCC; this feat is not trivial as the reactivity decreases with increased pH, while the solubility of such film-forming agents decreases with decreased pH, namely the desired solubility requires alkaline pH while the desired reactive requires acidic pH.

While searching for suitable system of compositions and ingredients, the present inventor has surprisingly found that when using polycarbodiimide crosslinking agents in acidic aqueous media, these low-temperature curing crosslinking agents do not diminish the ink immobilizing activity of the acid in the immobilizing composition it is dissolved in, and at the same time the acidic conditions in the immobilizing composition do not diminish the low-temperature reactivity of the crosslinking agent to the film-forming agents and the substrate.

It was also surprisingly found that the reactivity of the film-forming agents in the neutral or alkaline ink composition is sufficiently high towards the crosslinking agent, presumably due to the acidic media it is delivered with. The present inventor has found that the film-forming agents in the ink composition should contain sufficient number of carboxylic functional groups, such as found, for example, in acrylate polymers or urethane polymers and resins. Such film-forming agents can be selected according to the acid number (acid value) of the polymer/resin, so that an efficient crosslinking reaction can take place between the low-temperature curing carbodiimide crosslinking agent, the acrylic/polyurethane-based film-forming agent, and the substrate.

While reducing the present invention to practice, color images were printed by inkjet directly on untreated dark polyester/polyester blends fabrics, which were cured and washed. The resulting prints did not show any visible signs of dye migration and were stable during repeated wash fastness tests.

Inkset Designed for Color Printing on Dyed Synthetic Fabrics:

According to an aspect of embodiments of the present invention, there is provided an inkset that includes an immobilizing composition and at least one colored ink composition. In some embodiments of the present invention, the immobilizing composition is colorless and essentially transparent, and not intended to leave a mark on the substrate after the printing process is finished. In some embodiments, the immobilizing composition includes a low-temperature curing crosslinking agent (LTCC) and a first carrier, and the pH of the immobilizing composition is formulated to be lower than 7, namely the immobilizing composition is acidic.

The pH of the immobilizing composition includes an LTCC agent, according to some embodiments of the present invention, is formulated to be lower than 6.5, lower than 6, lower than 5.5, lower than 5, or lower than 4.5. In some embodiments, the pH of the immobilizing composition presented herein ranges from 4-6.5.

The ink composition is the part of the inkset that is intended to carry the colorant to the substrate, and thus it includes a dispersed colorant, an alkali-soluble agent, a high acid number film-forming agent and a second carrier. The ink composition carries one color to the substrate; hence, according to embodiments of the present invention, more than one ink composition may be present in the inkset, each for applying one color to the substrate, wherein the color that stems from the dispersed colorant may be any shade of any color, such as white, black, red, blue, green, cyan, yellow, magenta and any combination of these basic colors.

The inkset is designed specifically for printing a color image on a dyed substrate that includes synthetic fibers, which presents challenges stemming from the absorptive nature of fabrics in general, and from the tendency of the dye in synthetic fibers to become loose and migrate at elevated temperatures, which are typically used to cure the pigment-based ink composition after printing so as to form a well-adhered pigmented film on the surface of the substrate. The immobilizing composition of the present invention is therefore formulated to function in two ways:

i. to cause the ink composition, which is liquid and fluid, as it must be for being suitable for inkjet machinery, to settle upon contact therewith on the surface of the substrate; and ii. to deliver a crosslinking agent to the surface of the substrate that can react with film-forming agents in the ink composition upon curing, thereby forming a film that is affixed to the substrate, whereas the film constitutes the printed image.

Low Temperature Curing Crosslinking Agent:

In the context of embodiments of the present invention, the crosslinking agent is selected to be reactive towards, and form bonds with functional groups present in ingredients of the ink composition, jointly referred to herein as film-forming agents, as well as with functional groups exhibited by elements in the substrate, and further selected to exhibit this reactivity at curing temperatures that are lower than the temperature at which the dye in the substrate becomes loose.

In order to avoid dye migration during the ink curing step, the LTCC is selected such that it is capable of initiating the crosslinking reaction at a temperature that ranges from 90° C. to 110° C., or from 80° C. to 120° C., or from 90° C. to 120° C. In some embodiments, it is preferable that the initiation temperature of the crosslinking reaction is not met accidently when the composition is not yet in use (to extend shelf and pot life) or in the printing machine (to prevent clogging). In some embodiments, the LTCC is selected such that it is capable to propagate (continue after initiation) the cros slinking reaction at a temperature lower than 120° C., lower than 110° C., or lower than 100° C. Once initiated intentionally at the curing step of the printing process, the crosslinking reaction may continue rapidly or slowly in the film on the surface of the substrate.

In the context of embodiments of the present invention, the crosslinking agent is defined, and thus can be selected, based on the following properties: chemical compatibility with components of the ink and substrate (ability to form crosslinks); stability at storage and pre-curing printing temperatures; initial reactivity and optionally continuing reactivity after initiation, at temperatures lower than dye-migration temperatures, e.g., without limitation below about 120° C.

In some embodiments, the crosslinking agent is imbedded into a resin polymer as a comonomer in the main-chain of the resin, such that the polymer is regarded as a self-cros slinking resin, which will become crosslinked via the reactive pendant group of the comonomer, provided that the conditions for that reactions are met. For example, a polyurethane resin may include a silanetriol group at a certain frequency along the main-chain polymer, two of which can crosslink to form a siloxane bond that crosslinks two polyurethane chains upon the removal of water as the solvent (namely, upon drying).

Into the abovementioned definition of a low-temperature curing crosslinking agent fall a few families of crosslinking agents, such as, without limiting the scope of the invention thereto, carbodiimide crosslinking agents, and certain low $T_g$ self-crosslinking waterborne resins.

According to some embodiments of the present invention, the LTCC is a carbodiimide crosslinking agent, or a cross-linking agent having a "carbodiimide groups-containing component". The phrase "carbodiimide groups-containing component" refers to a composition of one or more monomer, oligomer or polymer molecules, or mixtures of one or more thereof, includes on average at least two (2) carbodiimide groups per molecule. In some embodiments of the present invention, the LTCC belongs to a family of molecules containing two or more carbodiimide groups, which are referred to herein as "polycarbodiimides", abbreviated to "pCDI".

The term "carbodiimide" refers to a linear triatomic —N=C=N— group. In the context of embodiments of the present invention, at least one of the nitrogen atoms in the carbodiimide group will be linked to or incorporated into a backbone or other bridging group to result in a molecule having at least two carbodiimide groups.

In one embodiment, the pCDI includes at least two units in a general arrangement $R_1$—(N=C=N—$R_2$—)$_x$—N=C=N—$R_1$, wherein x is a positive integer, $R_1$ and $R_2$ are each independently an alkylene or an arylene, preferably having from 1 to 24 carbon atoms.

Polycarbodiimides described by the foregoing have been disclosed in U.S. Pat. No. 4,977,219 and EP-A-0277361, the contents of which are incorporated by reference herein for all purposes as if fully set forth. For example, pCDI wherein $R_1$ is butyl, $R_2$ is isophorone and x is 3 (median value), can be made by reacting butyl isocyanate and isophorone diisocyanate in an ester solvent with phospholene oxide as a catalyst. The chain length can be controlled by the ratio of the mono and difunctional isocyanates, but there is always a distribution around the median x value.

EP-A-0628582, the disclosure of which is incorporated by reference herein for all purposes as if fully set forth, teaches pCDI wherein both $R_1$ and $R_2$ are aromatic. For example $R_1$ is phenyl and $R_2$ is tolyl. Previously incorporated EP-A-0277361 discloses a mixed aliphatic and aromatic polycarbodiimide crosslinking agents, wherein each molecule contains some aliphatic and some aromatic carbodiimides.

Examples of commercially available pCDI's, some of which are suitable for use as LTCC, according to embodiments of the present invention, include Ucarink® XL-29SE (Union Carbide) and EX-5558 (from Stahl Holland by). Further examples of pCDI's are described in U.S. Pat. Nos. 5,081,173, 5,047,588, 5,136,006, 5,373,080, 5,258,481, 4,487,964, EP-A-0241805, EP-A-0259511, EP-A-0274402, and EP-A-0277361, the disclosures of which are incorporated by reference herein for all purposes as if fully set forth.

LTCC polycarbodiimides can be polymers with a plurality carbodiimide groups appended to the polymer backbone. For example, U.S. Pat. No. 5,352,400, the disclosure of which is incorporated by reference herein for all purposes as if fully set forth, discloses polymers and co-polymers derived from alpha-methylstyryl-isocyanates. LTCC polycarbodiimides can have branched structures, like that described in Chapter 8 of Technology for Waterborne Coatings, E. J. Glass Ed., ACS Symposium 663, 1997; The Application of Carbodiimide Chemistry to Coating, by J. W.

Taylor and D. R. Bassett, the disclosures of which are incorporated by reference herein for all purposes as if fully set forth. These branched structures are prepared by reacting a multifunctional branched amine with an alkyl or aryl isocyanate, and then dehydrating the resulting urea compound to the carbodiimide. The branched amine could also be a dedrimeric amine containing more than three amino groups, leading to a dendrimeric polycarbodiimide. An advantage of this type of structure is that the distribution of the number of carbodiimide groups in the pCDI species is narrower than those species described earlier.

LTCC polycarbodiimide species, suitable for waterborne applications, contain hydrophilic groups which allow them to be water soluble or dispersible. These materials can be made by condensing aliphatic or aromatic di-isocyanates, and then reacting the terminal isocyanate groups on the linear carbodiimide polymer with a hydrophilic species, e.g., an alkyl-capped polyethylene oxide. Water compatible pCDI species can be prepared by starting with aliphatic or aromatic isocyanates, to yield species like those illustrated in U.S. Pat. No. 6,121,406, the disclosure of which is incorporated by reference herein for all purposes as if fully set forth, which describes a hydrophilic pCDI species in which the isocyanate endgroups on the precursor are reacted with a mixture of monohydroxy compounds of different hydrophilic character, e.g., polyethylene oxide monoalkyl ether and polypropyleneoxide monoalkyl ether.

U.S. Pat. No. 5,929,188, the disclosure of which is incorporated by reference herein for all purposes as if fully set forth, describes pCDI species that contain at least four molecular chains bonded independently to a backbone. Each of the molecular chains contains at least one carbodiimide group. The polyfunctional carbodiimide species can be produced by reacting (a) an isocyanate compound having at least one carbodiimide group and at least one isocyanate group with (b) a polyol, polyamine and/or amino alcohol having at least four hydroxyl, primary amino and/or secondary amino groups in a molecule.

U.S. Pat. No. 6,248,819, the disclosure of which is incorporated by reference herein for all purposes as if fully set forth, describes polycarbodiimide compounds modified for hydrophilicity, which have a structure such that a carbodiimide unit and a polyol unit occur alternately via a urethane bond, and a hydrophilic unit occurs at both molecular termini and is bound to such carbodiimide unit via a urethane bond. The number of repetitions of the carbodiimide unit and polyol unit are preferably 1 to 10.

Exemplary commercially available solvent-borne polycarbodiimide species is UCARLNK® Crosslinker XL-29SE. An example of a commercially available water-soluble polycarbodiimide is the Carbodilite® V series of multifunctional carbodiimides, manufactured by Nisshinbo Industries. An example of a commercially available water-dispersible polycarbodiimide is Carbodilite® E-02 (Nisshinbo Industries).

Cationic polycarbodiimides can be advantageous for certain embodiments of this invention. Such species can be prepared by reacting a quaternized amino alcohol or amine, like those described in previously incorporated U.S. Pat. Nos. 6,248,819 and 6,121,406. The bis-isocyanate terminated pCDI can, in addition, be chain extended with quaternary diols. An example of a commercially available bis-isocyanate terminated pCDI is Carbodilite® V-05, manufactured by Nisshinbo Industries.

Additional quaternary groups could be attached to the ends of a bis-isocyanate terminated pCDI by reacting an end-functionalized oligomer. This kind of oligomer can be prepared by group transfer polymerization of dimethylamino methacrylate starting with a silane-blocked hydroxy functional initiator. Once the oligomer is prepared, the tertiary amine groups can be quaternized with a methyl or benzyl group and the silane protected hydroxy group deblocked.

Commercially available LTCC polycarbodiimide species, suitable for inclusion in the immobilizing composition according to some embodiments of the present invention, include, without limitation, Carbodelite® V-10, Carbodelite® SW-12G, Carbodelite® E-05, Picassian® XL-701, Picassian® XL-702, Picassian® XL-725 and Picassian® XL-732, Carbodelite® E-02, Carbodilite® V-05 and Carbodelite® V-02-L2. In some embodiments of the present invention, Carbodelite® E-02, Carbodilite® V-05 and Carbodelite® V-02-L2 are excluded from the scope of the present invention. It is noted that some commercial LTCC pCDI products are less suitable for application in the context of some embodiments of the present invention, for being incompatible for printhead jetting requirements, for being incompatible with the acidic conditions in the immobilizing composition, and for having a shelf- and pot-life too short for practical industrial printing conditions.

According to some embodiments of the present invention, the LTCC is a self-cros slinking urethane/acrylic-based resins, or self-cros slinking polyurethane and/or polyacrylate resins (pure, mixtures and/or copolymers thereof), having a relatively low $T_g$ that allows the resulting film sufficient flexibility. One example is a low $T_g$ polyurethane resin having silanetriol groups forming a part of the polymer's chain. More specifically, the LTCC is a waterborne resin (a resin that is emulsified, suspended or dispersed in water) that when allowed to dry from water even at temperatures below 120° C., undergoes curing via intermolecular reactivity of —OH functionalities therein, such as found in the silanetriol groups. Examples of such low-temperature curing self-crosslinking waterborne resins include, without limitation, low-$T_g$ self-crosslinking aliphatic polyurethane and/or polyacrylic dispersions. Exemplary low-temperature curing self-crosslinking resins are described, for example, in U.S. Pat. No. 3,442,843 and U.S. Patent Application Publication No. 20070004856.

When using a low-temperature curing self-crosslinking resin, an additional crosslinking agent may be redundant in the ink composition. Hence, in some embodiments of the present invention, the ink composition is essentially devoid of an additional crosslinking agent, which is not the low-temperature curing self-crosslinking resin. In addition, the self-crosslinking resin may replace, at least to some extent, other resins, adhesion promoting agents and/or film-forming agents in the ink composition. In some embodiments, the self-crosslinking resin may form a part of the ink composition or the immobilizing composition.

When using a low-$T_g$ pH-sensitive low-temperature self-crosslinking resin as an LTCC, the resin also serves as a pH-sensitive agent, rendering the addition of an alkali-soluble agent redundant as well.

Commercially-available low-$T_g$ pH-sensitive low-temperature self-cros slinking waterborne resins that are suitable for use in the context of inkjet printing and the present invention, include, without limitation, members of the TAKELAC™ WS-Series, such as TAKELAC™ WS-6021.

Immobilizing Composition:

According to embodiments of the present invention, the immobilizing composition containing a low temperature curing crosslinking agent (LTCC-containing immobilizing composition) is capable of causing a change in an ink composition that leads to the immobilization of the ink composition that includes a dispersed colorant, an alkali-soluble agent, a high acid number film-forming agent and a carrier, whereas the immobilization of the ink droplets is effected upon contacting the two compositions, as discussed in detail hereinbelow.

Briefly, the immobilization of the ink composition is generally effected on at least a portion of a surface of a substrate with the aim of limiting or arresting inter-ink mixing (when more than one color is used for printing), soaking, spreading and feathering of the ink composition in/on the surface of the substrate, collectively referred to herein a as "bleeding", particularly when inkjet-printing the ink composition on an absorptive substrate, such as textile. Immobilizing the ink composition further assists in forming a film on the surface of the substrate, thereby providing a finished and cured printed image having improved color resolution and wash-fastness properties. According to some embodiments of the present invention, the substrate is a textile substrate, such as a woven or non-woven fabric, a cloth, a garment and/or a piece of clothing.

Quantitatively, "immobilization" in the context of embodiment of the present invention is defined as elevating the viscosity of the color-bearing ink composition by 10-folds, 50-folds, 100-folds, 500-folds 1000-folds or 2000-folds and more. For example, when a given color-bearing ink composition is characterized by having a viscosity of 10-13 cp, it is defined as immobilized when its viscosity is elevated to about 2000 cp or higher as a result of congelation. In some embodiments, the term "immobilization" is used to refer to a sharp increase in viscosity of a liquid, such that droplets of the liquid are less prone to flow, soaking, bleeding, spreading and feathering.

Hence the chemical and/or physical change, which affects the droplets of liquid ink composition, according to some embodiments of the present invention, is generally referred to herein as "immobilization". In the context of the chemical and mechanical change that occurs in the ink composition, according to some embodiments of the present invention, the term "immobilization", as used herein, is interchangeable the terms "coagulation", "congelation", "flocculation", "precipitation", "thickening" or "gelation", and refer to the sharp decrease in fluidity of a formerly fluid liquid. Coagulation can be effected also by, or seen as sedimentation, precipitation, partial solidification and partial polymerization of soluble constituents in the composition. The term "sedimentation", as used herein, refers to the destabilization of suspended colloidal or emulsified substances, such as pigment particles. The term "flocculation", as used herein, refers to the bridging between particles by a polymer chain, causing them to form flocs or larger aggregates that might sediment or precipitate.

According to some embodiments of the present invention, the LTCC-containing immobilizing composition is formulated to carry and deliver an LTCC agent and render the surface of the substrate into an acidic environment; the LTCC-containing immobilizing composition does not contain a colorant and is thus substantially transparent and colorless, and intended not to leave a distinguishable mark on the substrate. Thus, according to some embodiments of the present invention, the LTCC-containing immobilizing composition is essentially devoid of a colorant.

According to some embodiments of the present invention, the pH of the immobilizing composition is acidic due to the presence of an acid therein. In such embodiments, the pH of the immobilizing composition is lower than 6.5, or ranges about 2-6.5, or about 3-5, or about 2-4. Optionally, the pH of the immobilizing composition ranges about 3-6.5, 4-6.5 or 5-6.5, or any value in-between. The immobilizing composition may or may not contain a buffering agent. According to some embodiments, an immobilizing composition may be buffered by a suitable salt or weak base, such as ammonia/ammonium base or another volatile amine, to ensure the desired pH range while not leaving undesired traces on the substrate. Buffering may be accomplished by a buffering agent, such as, but not limited to a weak amine such as tris(hydroxymethyl aminomethane), also referred to as Tris or THAM.

A small molecule acid, organic acid or polymeric acid, may cause an ink composition containing a pH-sensitive alkali-soluble agent to coagulate/congeal, and some acids might be more preferable for use in some embodiments and printing conditions and tasks. Less favorable acids include acids that impart a noticeable odor, or may burn-out the substrate, or leave a stain in the substrate, or cause a dye in the ink composition or the substrate to migrate or otherwise be diminished. According to embodiments of the present invention, suitable acids include glycolic acid (volatile), acetic acid (volatile with some vinegar odor), lactic acid (dimerized at elevated temperatures), malic acid, ascorbic acid, maleic acid, benzoic acid, some polymeric acids (acidic polymers), and any combination of the foregoing.

In some embodiments of the present invention, the LTCC-containing immobilizing composition may include one or more acidic agents (acids) in a total amount that ranges from about 0.1% to about 20% of the total weight of the immobilizing composition, or 0.5-15%, 0.5-10%, 0.1-5%, or 0.5-4%, or 0.5-3%, or 1-5%, or 1-4%, or 1-3%, or 1-2% acidic agents (acids) of the total weight of the immobilizing composition. If one acid or more is utilized, each acid may be present in any ratio between 0 and 100% includes the blend of acids as long as the total amount of the acids in the immobilizing composition is within the desired range.

According to some embodiments of the present invention, the immobilizing composition is aqueous, namely the first carrier includes water. In some embodiments, the aqueous carrier further includes a water-miscible organic solvent. The ratio of water to the water-miscible organic solvent ranges from 100:1-1:1. An exemplary family of water-miscible organic solvents are glycol ethers, which include, without limitation, dipropylene glycol methyl ether, ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether and diethylene glycol mono-n-butyl ether.

According to some embodiments of the present invention, the aqueous carrier can be made to be fast penetrating (rapid drying) by including surfactants or penetrating agents such as glycol ethers and 1,2-alkanediols such as ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

The LTCC-containing immobilizing composition presented herein is formulated so as to be suitable for application thereof in-line of an inkjet printing process. In other words, the immobilizing composition is designed to be applied directly on the substrate as part of the printing process rather than a pre-treatment step before the printing process, which can take place off-line of the inkjet printing process. Such formulation incurs some limitations of the immobilizing composition, particularly in the sense that the composition is required to be suitable for inkjet applicators that form a part of the inkjet machinery, and particularly the parts that involve direct inkjet printing.

The mechanical properties of the LTCC-containing immobilizing composition presented herein are correlated, at least to some extent, to the properties of the liquid applicator used to apply the composition on the substrate. Suitable applicators include high-output capacity spray nozzles that are typically used to cover relatively large area of the substrate at relatively low resolution, and inkjet printheads, the latter being more delicate and complex and used for accurate drop placement (high resolution) at relatively low-output capacity. For simplicity, the term "nozzle" is used herein to refer to the high-output low resolution liquid applicator, and the term "printhead" is used to refer to the low-output high resolution liquid applicator. Output capacity may also be affected by the relative speed by which the applicator moves over the substrate (or the substrate moves under the applicator) during the printing process, however the output capacity is determined while taking that relative motion into account by reporting the total amount of liquid that is being delivered to a unit area at a unit time. A typical printhead delivers ink according to the varied digitized color requirements at any given image segment ("pixel"), pallet motion and printhead frequency, while a typical spray nozzle delivers constant amount under constant pressure of liquid over time, varied by pallet motion. For an exemplary comparison, a spray output capacity of a nozzle ranges about 4-5 grams per square inch at a pressure of about 1.5 bar, while the jetting output capacity of a printhead ranges about 0.02-0.05 grams per square inch.

According to some embodiments, when the LTCC-containing immobilizing composition is designed to be applied (sprayed) by a nozzle, its ingredients are selected and/or treated such that the composition exhibits (characterized by) at least one of the following attributes:
 a maximal particle size of less than 10, 15 or 20 microns;
 a dynamic viscosity at shear that ranges from 2 to 4 (N·s)/m2;
 a room temperature Brookfield viscosity less than 3 centipoises;
 a surface tension that ranges from 24 to 26 N/m; and
 an electrical resistance of 50 to 2000 ohm per centimeter.

According to some embodiments, when the LTCC-containing immobilizing composition is designed to be applied (jetted) by a printhead, its ingredients are selected and/or treated such that the composition exhibits (characterized by) at least one of the following attributes:
 a maximal particle size of less than 1, 5 or 10 microns;
 a dynamic viscosity at shear that ranges from 8 to 20 (N·s)/m2;
 a room temperature Brookfield viscosity less than 25 centipoises;
 a surface tension that ranges from 24 to 32 N/m; and
 an electrical resistance of 50 to 2000 ohm per centimeter.

According to some embodiments of the present invention, the LTCC-containing immobilizing composition is a water-based composition, and the immobilizing composition carrier, namely the first carrier, is an aqueous carrier, or water.

According to some embodiments, the immobilizing composition and/or the ink composition are substantially devoid of an aziridine and/or a small-molecule isocyanate.

According to some embodiments, the immobilizing composition is substantially devoid of a high acid number polymer.

Colored Ink Composition:

In some embodiments, the colored ink composition includes a low-temperature curing self-crosslinking resin, which is dispersed or emulsified in the main carrier of the ink composition, namely the low-temperature curing self-crosslinking resin is waterborne and thus suitable for use in the context of a water-based inkjet ink composition. In the context of embodiments of the present invention, other than acting as a low-temperature crosslinking agent, the low-temperature curing self-crosslinking resin may also act at least as one of the following ink composition elements: a film-forming agent, an adhesion promoting agent, and as a binder.

In some embodiments, the low-temperature self-crosslinking resin also acts as a pH-sensitive agent, and more specifically, as an acid-sensitive low-temperature self-croslinking resin, which is defined herein as a polymer having pendant groups and/or end-capping groups capable of undergoing a chemical reaction therebetween to afford a covalent bond, wherein the reaction is initiated and/or catalyzed by the presence of an acid (e.g., $H^+$ ions).

In some embodiments, the pH-sensitive low-temperature self-crosslinking resin is also characterized by a low glass-transition temperature ($T_g$). In the context of embodiments of the present invention, a low $T_g$ polymer/resin is a polymer which is characterized by a $T_g$ below 0° C., or a $T_g$ that ranges from −60° C. to 0° C., as this physical property is measured, for a non-limiting example, in a thin film of about 50-100 µm made from the pure polymer than has been cured by heat and/or drying for 24 hours. It is understood that there are other means to determine $T_g$ of a polymer, and the present embodiments are meant to encompass these other $T_g$ measuring methods as well.

In some embodiments, the low-$T_g$ pH-sensitive low-temperature self-crosslinking resin is a polyurethane polymer/resin or a polyacrylic polymer/resin or a urethane/acrylic copolymer/resin having silanol pendant and/or end-capping groups. A silanol, according to some embodiments of the present invention, is a —Si(R)(R')—OH group, where R and R' are each independently a low alkyl or a hydroxyl group. For example, a —Si(R)(OH)$_2$ group is a silanediol group, and a —Si(OH)$_3$ group is a silanetriol group. When present as a pendant/end-capping group in a polymer, the silanol is capable of forming siloxane (—Si—O—Si—) bonds, the formation of which is enhanced by drying (removal of water), and/or heat (also at temperatures lower than 120° C. or lower than 100° C.), and/or acidic conditions (the presence of an acid/H+ ions). The relative amount of the silanol groups has an effect on the of the polymer, hence, according to embodiments of the present invention, the low-$T_g$ pH-sensitive low-temperature self-crosslinking resin is selected to comply with the above-defined properties, including inkjet compatibility, waterborne, low-temperature self-crosslinking groups, pH-sensitive reactivity and low-$T_g$.

As demonstrated in the Examples section that follows below, an inkset includes an immobilizing composition and a colored ink composition that includes a low-$T_g$ pH-sensitive low-temperature self-crosslinking resin as an LTCC, exhibited excellent rub-resistance and wash-fastness as well as excellent color stability when used to form a color image on a dyed synthetic fabric. The ink composition was capable of affording these results without adding an additional film-forming or adhesion promoting agents or binders, and the immobilizing composition used with this colored ink composition was capable of affording these favorable results without the use of any additional crosslinking agent.

In some embodiments, the colored in composition of the presently provided inkset, includes, a dispersed pigment (waterborne pigment), a low-$T_g$ pH-sensitive low-temperature self-crosslinking resin and water, as well some optional ingredients such as humectants/wetting agents (various glycols), antimicrobial agents, antifoaming agents, anticorrosion agents, pH-adjusting and buffering agents (pH higher than 7, or higher than 8); and the immobilizing composition of the presently provided inkset, includes, an acid and water, as well some optional ingredients such as humectants/wetting agents (various glycols), antimicrobial agents, antifoaming agents, anticorrosion agents, pH-adjusting and buffering agents (pH lower than 7, or lower than 6). In some embodiments of the present invention, the inkset provided herein for printing color images on dyed synthetic fabrics, includes a colored ink composition that is essentially devoid of an adhesion promoting agent, a film-forming agent or a binder other than the low-$T_g$ pH-sensitive low-temperature self-crosslinking resin, and the immobilizing composition is essentially devoid of a cros slinking agent, such as an LTCC.

The amount of a pH-sensitive low-temperature self-crosslinking resin in the colored ink composition may range 5-15 wt. % based on dry weight of the resin in the composition, or 5-20 wt. %, 7-25 wt. %, or 10-30 wt. %.

The LTCC-containing immobilizing composition presented herein is designed to interact with a suitable colored ink composition, referred to herein in short as "ink composition", namely the liquid formulation that carries a colorant to the surface of the substrate, thereby forming a printed image or design thereon.

The ink composition, includes a colorant (typically a dispersed pigment), an alkali-soluble agent, a high acid number film-forming agent and a carrier. The ink composition may further include other ingredients, such as additional resin binders, additional film-forming agents, additional adhesion promoting agents and additional dispersing agents.

The term "colorant", as used herein, describes a substance which imparts the desired color to the printed image. The colorant may be a pigment or a dye. Pigments are solid colorants with are typically suspended in the carrier of the ink composition as dispersed particles, whereby dyes are colorants which are dissolved in the carrier of the ink composition. Some dyes may be insoluble liquids which form emulsions with the carrier. According to embodiments of the present invention, the colorant is a dispersed pigment.

According to some embodiments, the alkali-soluble agent is in a form of a dispersed agent and/or emulsified agent. In such embodiments, the presence of the acidic immobilizing composition causes the alkali-soluble dispersed agent and/or alkali-soluble emulsified agent to break out of its dispersed and/or emulsified state and cause immobilization of the ink by congelation; the dispersed pigment precipitates and becomes too viscous to flow, thus its substrate penetration and soaking and inter-ink mixing is essentially prevented.

In some embodiments, the alkali-soluble agent, selected for its capacity to coagulate upon contacting an acid or otherwise being in an acidic environment, is at least one of the group consisting of a resin binder, a dispersing agent, an adhesion promoting agent and a film-forming agent. In some embodiments, the alkali-soluble agent is a dispersing agent, such as used for dispersing pigments. In some embodiments, the alkali-soluble agent is a resin binder, such as used to improve the cohesion of the film. In some embodiments, the alkali-soluble agent is an adhesion promoting agent, such as used to improve the adhesion of the film to the substrate. In some embodiments, the alkali-soluble agent is a film-forming agent.

In some embodiments, the alkali-soluble agent is selected from the group consisting of an alkali-soluble resin, an alkali-soluble polymer, an alkali-soluble dispersant, an alkali-soluble surfactant, an alkali-soluble coagulant and an alkali-soluble gelling agent.

Chemical characterization of the alkali-soluble agent include a plurality of functional groups that are charged at neutral or alkali conditions, and become neutral in acidic conditions. For example, a carboxylate group (—C(=O)—O−) being negatively charged at neutral or alkali conditions, may become neutral at acidic conditions (—C(=O)—OH), thereby rendering the molecule it is attached to less water soluble. In some embodiments, the alkali-soluble agent is selected from the group consisting of an acrylate polymer, an emulsified polyurethane, a polyurethane polymer, a polyether polymer, a polyester polymer, a polyacrylate polymer, a polyvinyl chloride polymer, a polyvinyl acetate polymer, a polyvinyl butyral polymer, an aminosilicon polymer and any salt or combination thereof.

Any one of the above resin binder, a dispersing agent, an adhesion promoting agent and a film-forming agent, and other optional and/or additional ingredients of the ink composition may also confer stretchability to the resulting image. Such agents are generally referred to herein as proto-elastomeric film-forming agents which imparts elastic stretchability. In some embodiments the proto-elastomeric film-forming agent is also the alkali-soluble agent, and in some embodiments the proto-elastomeric film-forming agent is not the alkali-soluble agent. In general, when proto-elastomeric film-forming agents co-polymerize, crosslink and cure and thereby affix to the substrate, a soft, flexible and stretchable elastic film is formed which is characterized by a relatively low Tg.

According to some embodiments of the present invention, the ink composition is a water-based inkjet ink composition, thus the carrier of the ink composition is an aqueous carrier or water.

The ink compositions contemplated within the scope of the present invention, may carry transparent or translucent colorants. The basic colorants in inkjet ink compositions are required to be transparent or translucent, since only a few (typically 3-8) basic colors are used and the full spectrum of colors and shades is achieved when these basic colors are perceived by the eye as mixed in various combinations on the substrate. However, direct printing of multicolor images using transparent inks on any surface requires the surface, which is the background of the image, to be white or at least lightly-colored, since its inherent color participates in the formation of the final perceived color, together with the colorant in the inks applied thereon. Surfaces of darkly colored or non-white substrates tend to render the primary-colored ink drops indistinguishable or substantially color-skewed since the final perceived color stemming from any combination of the primary colors is a subtraction of that particular combination from the color white, or at least from a bright light color. It is therefore a physical requirement that the background of an image generated directly onto a surface be a bright light color or white.

To overcome the problem of printing on a non-white substrate, an opaque white underbase layer may be printed on the substrate before the translucent colored ink composition is printed. This opaque underbase layer is afforded by an opaque ink composition, according to some embodiments of the present invention. The opaque ink composition, according to some embodiments of the present invention may also contain an alkali-soluble agent, and thus may be designed to congeal upon contacting the LTCC-containing immobilizing composition presented herein.

According to some embodiments, the opaque ink composition is essentially white, affording an opaque white layer when jetted on a darkly-colored or non-white surface. According to some embodiments, the white opaque pigment is suitable-sized particles of a metal oxide, such as, for example, titania (titanium dioxide or rutile).

According to some embodiments, in order to serve as an underbase for a stretchable and flexible image, the opaque underbase should also be stretchable, with a high elongation factor that enables the image printed thereon to maintain its background when stretched with the substrate, without having the (colored) substrate to be seen therethrough and without having the image or the underbase crack under physical pull and tug.

The opaque ink composition, according to some embodiments of the present invention, is suitable for inkjet printing of "spot" colorants, which are substantially opaque colored inks. Spot colorant can be jetted like any other transparent colorants, and are typically used to generate special effects in order to afford highlights and emphases over the image usually in pre-defined coloration.

In general, any reference to an ink composition made herein, should be taken as referring to any translucent ink composition of any color, and to any opaque ink composition of white or any other spot color, unless stated otherwise.

According to some embodiments, the inkset presented herein includes an immobilizing composition that includes an LTCC agent and a first carrier being formulated to exhibit a pH lower than 7, and at least an opaque white ink composition that includes a dispersed white pigment, an alkali-soluble agent, a high acid number film-forming agent and a second carrier. In some embodiments the first and second carriers are aqueous carries.

Co-Reactive Fibra Forming Agent:

An LTCC polycarbodiimide agent is more likely to form crosslinking bonds with carboxylic groups found in various resins and polymers in the ink composition, and in the substrate. In order to make the curing step more efficient and thereby improve adhesion of the film (image) to the surface of the substrate, it is preferable to use high acid number agents in the ink composition.

Improved adhesion of the film gives the final printed product better durability or fastness. Herein, reference to "durability" or "fastness" generally means the resistance of the printed image to color removal such as, for example, rub resistance (finger rub), water fastness (water drop), wash fastness (laundering), smear fastness (highlighter pen stroke) or crock fastness on textile.

In the context of embodiments of the present invention, a co-reactive species is an agent comprised preferably of a plurality of functional groups (moieties of one or more types) that react with carbodiimide groups. A co-reactive species could be unstable if mixed together with polycarbodiimide species in one composition. Thus the combination of co-reactive species and polycarbodiimide species is applied on the surface of the substrate as separate compositions, and mixing is accomplished on the printed substrate.

Carbodiimide-reactive groups include groups with active hydrogen such as carboxyls, hydroxyls, phenols, beta-diketones, thiols, and primary and secondary amines. Sulfonate and phosphonate groups will also react with a carbodiimide in a condensed film that is mostly free of water, but the reaction tends to be slower.

Preferably, the co-reactive species includes more than one moiety that will react with carbodiimide groups so that the reaction of co-reactive species and pCDI species yields a crosslinked printed layer characterized by high durability. The co-reactive species can be a polyfunctional molecule, an oligomer or a polymer, and can be soluble in the carrier of the ink composition or dispersed (e.g. latex, emulsion, or hydrosol) as a separate phase. The oligomers or polymers can be based on acrylic urethane, polyester, polyamide, polyvinyl, polyether, polyamine and cellulosic structures; the polymer or oligomer structures could include random, block, branched, star or dendrimer structures. Latex or dispersion particles can have a homogeneous or core/shell structure.

The co-reactive species may be present in the ink in one or more different capacities for a variety of functions. For example, the co-reactive species can be present as a polymeric dispersant for insoluble colorants (such as pigments) or other insoluble ink components. The co-reactive species might also be a present as self-dispersed pigment particles with multiple pendant co-reactive groups. The co-reactive species can also be present as an "additive" as a film-forming agent, and/or a surfactant and/or as a binder.

The co-reactive species can be single type of co-reactive moiety or a combination of two or more different types of co-reactive moieties. Carboxylic acids react with 1,3-carbodiimide groups at room temperature, in polar environments or in the presence of tertiary amines, to form acyl urea linkage. Amines react with 1,3-carbodiimide groups, albeit at a slower rate than carboxylates, to yield guanidines. Other active hydrogen groups are also known to react with 1,3-carbodiimide groups, including hydroxyl, phenolic, beta keto structures and mercaptans. A review of 1,3-carbodiimide chemistry has been written by Williams and Ibrahim in Chemical Reviews, 81, 589-636, 1981 (the disclosure of which is incorporated by reference herein for all purposes as if fully set forth).

The rate at which a given pCDI species reacts with an active hydrogen compound depends on a number of factors. Aliphatic pCDI's are more reactive (as much as 50-times) than aromatic ones, and the reaction rate can be further reduced, if desired, by adding steric hindrance near the CDI groups. The pCDI's react with sulfonates and phosphates at a much slower rate than carboxylates. The reaction of pCDI's with any of these acid groups is much slower in the presence of water.

A faster reaction of a carboxylated resin with a pCDI occurs at a weakly acid to neutral pH, and is somewhat slower under alkaline conditions. If the carboxylate species is neutralized, a tertiary amine is preferred. Ammonia can also be used, but an excess can lead to a loss of crosslinking ability of the pCDI. The desired rate at which the pCDI species and the co-reactive species react may depend on the requirements of the printed item. In some instances a very fast crosslinking may be desirable, for example the printed item needs to have water fastness or smear resistance immediately after printing. In this case, a fast reaction accelerated by some heating would be beneficial. However, if the ink containing the co-reactive species contains a polymer latex or dispersion with reactive groups, it may be desirable for these components to coalesce before the crosslinking has progressed to a substantial degree so that a crosslinked continuous printed layer is obtained rather than a layer of weakly adhered crosslinked particles.

Monomeric polyamines suitable as co-reactive species include members selected from the group $NH_2(CH_2)_nNH_2$, where n is an integer from 2 to 8, such as ethylenediamine, propylene diamine, tetramethylene diamine, pentamethylene diamine, hexamethylene diamine, heptamethylene diamine and octamethylene diamine. Also included are members selected from the group $H_2NCH_2CH_2(NHCH_2CH_2)_nNH_2$, where n is an integer from 1 to 4, such as diethylene triamine, triethylene tetramine, and tetraethylene pentamine.

Representative polymeric polyamines useful as co-reactive species include polyethyleneimine, polyvinylamine, polydiallylamine, polyallylamine, poly(vinylamine-co-vinylalcohol) and polyaminoamides prepared by reaction of polyalkyene polyamines with aliphatic dicarboxylic acids. An example of the last is the polyaminoamide prepared by reaction of diethylene triamine with adipic acid.

Other useful polyamines include amine derivatives of a polyol: polyethylene oxides, and glycerin having a terminal amino group, including the compounds represented by structural formulas B-1 and B-2 described and illustrated in U.S. Pat. No. 6,503,307 (the disclosure of which is incorporated by reference herein for all purposes as if fully set forth). Also useful are polymers of ethylenimine, including the compounds represented by structural formula B-3 described and illustrated in previously incorporated U.S. Pat. No. 6,503,307. Commercial products corresponding to these materials include, for example, Lupasol® FG, Lupasol® G20 water-free, Lupasol® G20, Lupasol® G35 and Lupasol® WF, from BASF Co.; and Epomin® SP-006, Epomin® SP-012, Epomin® SP-018, Epomin® SP-200, Epomin® PP-061, Epomin® PP-1000, from Nippon Shokubai Kagaku K. K.

Other useful polyamines can also include glucosamine; dimers of glucosamine; amino sugars of 3 to 10-mer of glucosamine; and oligomers of sugar structures, for example partial acetylation, having plural primary amino groups in the molecule. These compounds may be modified in the structure, provided that the modified compound is water-soluble. The specific examples are shown by structural formulas B-4 to B7 described and presented in previously incorporated U.S. Pat. No. 6,503,307.

Examples of poly-beta-diketone co-reactive species include latex particles with pendant beta-keto groups incorporated into a styrene, lauryl methacrylate, methacrylic acid emulsion latex with the addition of methacryloylacetone to the polymerization, as described in EP-A-0900831 (the disclosure of which is incorporated by reference herein for all purposes as if fully set forth). Another example includes, as described in U.S. Pat. No. 6,040,358 (the disclosure of which is incorporated by reference herein for all purposes as if fully set forth), the water dispersible beta-diketone acrylic co-polymers with 5-40% by weight of a polymerizable beta-diketone and 5 to 50% by weight of another polymerized moiety that renders the polymer soluble upon neutralization. Preferred beta-diketone monomers would include acetoacetoxy ethyl methacrylate, acetoacetamide ethyl methacrylate, and methacryloylacetone.

Examples of polythiol co-reactive species include useful water-soluble polythiol compounds, as shown by structural formulas B-8 to B-17, described and illustrated in previously incorporated U.S. Pat. No. 6,503,307, incorporated herein by reference in its entirety.

Most useful are polymers having a high acid number. The acid number is a measure of the amount of carboxylic acid groups in a chemical compound, or in a mixture of compounds, such as co-reactive species in an ink composition. A high acid number means a large number of carboxylic acid groups. The term "acid number" or "acid value" or "neutralization number", as used herein, refers to the mass of potassium hydroxide (KOH) in milligrams that is required to neutralize one gram of a chemical substance.

In the context of some embodiments of the present invention, the acid number of a high acid number film-forming agent useful for the ink composition disclosed herein, is greater than 8, 10, 15, 20, 25, 30, 35, 40, 45, 50, 55, 60, 65, 70, 75, 80, 85 or greater than 90 mg KOH/gram.

Exemplary high acid number agents include, without limitation, acrylic resins such as polyacrylic acid, acrylic acid-acrylonitrile copolymer, potassium acrylate-acrylonitrile copolymer, vinyl acetate-acrylate ester copolymers and acrylic acid-acrylate ester copolymers; styrene-acrylic resins such as styrene-acrylic acid co-polymer, styrene-methacrylic acid copolymer, styrene-methacrylic acid-acrylate ester co-polymers, styrene-alphamethylstyrene-acrylic acid copolymer, styrene-alpha-methylstyrene-acrylic acid-acrylate ester copolymers; styrene-maleic acid copolymer, styrene-maleic anhydride copolymer, vinyl naphthalene-acrylic acid copolymer, vinyl naphthalene-maleic acid copolymer; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; isobutylene-maleic acid resin, rosin-modified maleic acid resin, alginic acid derivatives, carboxymethyl cellulose or carboxymethyl starch, carboxylated polyester, carboxylated cellulose acetate butyrate and any salts, co-polymers and/or combinations thereof.

According to some embodiments of the present invention, exemplary high acid number film-forming agents include polyacrylic acid, acidic alkoxylated polymer, poly(2-acrylamido-2-methylpropanesulphonic acid), poly(acrylic acid-co-maleic acid), poly(butadiene-co-maleic acid), poly(ethylene-co-acrylic acid), polymaleic acid, poly(methacrylic acid), poly(4-styrenesulfonic acid-co-maleic acid), and any salt thereof, any mixture thereof, co-polymers and/or combinations thereof.

Commercially available co-reactive high acid number film-forming agents include, without limitation, Joncryl® 538, Econext® 230, Takelac W-5661 (35%), Takelac W-6110 (32%), Takelac W-6355 (34-36%), Takelac W-6061 (30%), Takelac W-6021, Joncryl flx 5010 (40%), Joncryl flx 5026 (40%), Picassian AC-049, Picassian AC-122, Picassian AC-169, Picassian AC-213, Picassian AC-246, Picassian AC-111, PU dispersions, Relca PU-415 and Relca PU-426.

It is noted herein that some co-reactive high acid number film-forming agents may also act as alkali-soluble agents, and some alkali-soluble agents may also act as high acid number film-forming agents, and the invention contemplates compositions of the inksets presented herein that may contain high acid number film-forming agents that are also alkali-soluble agents and vice versa, and compositions that contain any combination of alkali-soluble agents and high acid number film-forming agents as long as the composition contains at least one ingredient that is a high acid number film-forming agent and at least one ingredient that is an alkali-soluble agent, which can be the same ingredient or more than one ingredient.

Dyed Synthetic Fabric Substrates:

In general, the inkset is formulated for use in a digital inkjet printing machine, which applies the various compositions directly on the substrate according to a predetermined pattern that is effected digitally by the printing machine. Preferably, the instantly provided inkset is for digitally printing a color image on a dyed substrate. The image is formed as a film that encapsulates and affixes colorants, typically dispersed pigments, to the surface of the substrate.

According to some embodiments, the dyed substrate is a fabric that includes at least some dyed synthetic fibers, which are dyed by a colorant that may become loose at elevated temperatures (above about 110-120° C.). Synthetic fibers that are typically used in the production of fabrics as threads and otherwise, include polyester fibers, polyurethane fibers, polyamide fibers, polyacryl fibers, polyolefin fibers, polybenzimidazole fibers, and any co-polymer thereof, Nylon fibers, polyacrylonitrile (Modacryl) fibers, Rayon fibers, Vinyon fibers, Saran fibers, Spandex fibers, Vinalon fibers, Aramid fibers, Modal® fibers, Dyneema® fibers and Spectra® fibers, and combination thereof with cellulosic fibers and/or animal fibers, and combination of the foregoing.

In the context of embodiments of the present invention, the substrate, or at least some fibers therein, is dyed with a migratable dye. A migratable dye sublimates at elevated temperatures, migrates into the ink layer, and the result is bleed and discoloration of the cured printed image (film). Such heat-set migratable dyes are used in fabrics that contain polyester and other synthetic fibers, and when these dyed fabrics are heated to the sublimation temperature of their dyes, the dye converts to gas. When this sublimation process takes place in the presence of an ink layer, such as in the case of pigment-binder film, the sublimated dye migrates into the film. The results of dye migration may take several days to show up after printing, sometimes after the fabrics/garments have been packed and shipped to the customer.

According to embodiments of the present invention, migratable dyes sublimate at temperatures ranging from 180-215° C., while curing the pigment-binder film is typically effected at 160° C.; however, most curing apparatus compensate for heat loss to maintain an average curing temperature as set, thereby reaching temperatures higher than the set curing temperature. Moreover, dye migration may also occur at temperatures lower than, yet close to the dye sublimation temperature. Thus, as used herein, the term "migratable dye", as used herein, refers to a dye that migrate at a temperature higher than 120° C., or higher than 130° C., or higher than 140° C., or higher than 150° C., or higher than 160° C., whereas the term "migrate" refers to the heat-driven process by which the dye spreads, by sublimation or otherwise, from the substrate into the film of the image printed thereon.

The inksets, composition and processes provided herein are particularly useful for inkjet printing color images on dyed synthetic fabric substrates that have not been pre-treated prior to the printing process, as discussed herein. In other words, the substrate for which the present invention is useful, includes untreated dyed substrates. The term "untreated, as used herein, refers to any dyed substrate that has not been treated for prevention or limitation of dye migration prior to, and/or off-line of printing process discussed herein. The inkset provided herein allows printing color images on dyed synthetic substrates while not suffering from dye migration, without the need for the dyed synthetic substrate to be pre-treated. Pre-treatment for dye migration known in the art include, without limitation, coating the surface to be printed on with substances that block or limit the movement of sublimable dyes, and/or substances that trap and decolorize sublimable dyes.

Printing Process for Dyed Synthetic Fabrics:

In the context of embodiments of the present invention, the immobilizing composition and the ink composition can be applied on the substrate concomitantly or virtually simultaneously. Alternatively, the immobilizing composition and the ink composition can be applied on the substrate following one-another, with some delay in between (over a short period of time measured in seconds) than may range from 0.01 seconds to 120 seconds, or 0.01-90, 0.01-60, 0.01-45, 0.01-30, 0.01-20, 0.01-10, 0.01-5 or 0.01-1 sec.

The sequence and timing will depend on the needs of the application. For example, on a porous substrate, there might be benefits in applying the immobilizing composition first, especially when the ink composition is cationic ionic or contains multivalent cations, followed by the colored ink composition to limit the latter's penetration into the substrate. This could limit bleed and provide a chroma boost as well as a more durable crosslinked layer. Alternatively, the colored ink composition is jetted first followed by the immobilizing composition to provide maximum durability on the top of the printed layer. If the two compositions are applied concomitantly or virtually simultaneously, then the mixing of the two compositions would be maximized and the whole layer would have more uniform crosslinking.

Once the image is printed on the substrate, using the inkset according to some embodiments of the present invention, the process further includes curing the image at a relatively low temperature, so as to initiate the crosslinking reaction yet not cause the sublimable dye in the substrate to migrate and stain the freshly formed film printed and cured thereon.

Thus, according an aspect of some embodiments of the present invention, there is provided a process for digital inkjet printing color images directly on a dyed substrate using the inkset described herein, the process includes:

Applying the acidic LTCC-containing immobilizing composition described herein on at least a portion of the substrate using a printhead (small amounts for areas of the substrate where the image is printed on) or a spray nozzle (large amounts for larger areas requiring lower resolution), or, alternatively, applying the acidic immobilizing composition, devoid of an LTCC, described herein, on at least a portion of the substrate using a printhead (small amounts for areas of the substrate where the image is printed on) or a spray nozzle (large amounts for larger areas requiring lower resolution);

printing the ink composition described herein, either includes a co-reactive film-forming agent or includes a low-$T_g$ pH-sensitive low-temperature self-crosslinking resin, directly on the aforementioned portion of the substrate; and initiate a crosslinking reaction by drying and/or heating the substrate to a temperature lower than 110±5° C. to thereby cure and form the image (a film) on the surface of the substrate. In the context of the present invention, the term "curing" encompasses any step of the printing process wherein the components of the freshly printed image undergo crosslinking to form a cured film on the surface of the substrate; thus, curing includes drying, heating and/or allowing time to elapse, until crosslinking has initiated, propagated and/or completed.

It is expected that during the life of a patent maturing from this application many relevant methods, uses and compositions will be developed and the scope of the terms methods, uses, compositions and polymers are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Colored Ink Composition

The colored ink composition is formulated to be compatible with the printing machine, an LTCC-containing immobilizing composition, the low-temperature curing cros slinking agent (LTCC) and the substrate.

According to some embodiments of the invention, the alkali-soluble may be selected from commercially available products, such as, for example Joncryl® HPD-96, Joncryl® 96, Joncryl® 586, Joncryl® 678, Joncryl® 296 and Joncryl® 538.

According to some embodiments of the invention, the high acid number film-forming agent may be selected from commercially available products, such as, for example, Joncryl® 538, Econext® 230, Takelac W-5661 (35%), Takelac W-6110 (32%), Takelac W-6355 (34-36%), Takelac W-6061 (30%), Takelac W-6021, Joncryl flx 5010 (40%), Joncryl flx 5026 (40%), Picassian AC-049, Picassian AC-122, Picassian AC-169, Picassian AC-213, Picassian AC-246, Picassian AC-111, PU dispersions, Relca PU-415 and Relca PU-426.

A typical ink composition, according to some embodiments of the present invention, includes:

Humectants, such as ethylene glycol and/or glycerin (20-40 wt. %);

Coalescing agents, such as propylene glycol (PG) and/or 1-((3-hydroxy-2,4-dimethylpentan-2-yl)oxy)-3-methylbutan-2-one (Texanol) (5-10 wt. %);

Pigment concentrate, such as yellow, cyan, black, magenta, or white $TiO_2$ pigment 60% concentrate (15-20 wt %);

Acid-sensitive pigment dispersant, such as polymeric non-ionic, polymeric anionic and/or polymeric cationic) dispersants;

Binder resins for reacting with polycarbodiimide crosslinking agent, such as neat or mixtures of water-based emulsions, dispersions or solutions of acrylic and/or polyurethane resins having an acid number of more than about 10 (25-45 wt %);

Microbiocide, such as Acticide® MBS (0.2-0.3 wt %);

Water to QS;

pH of 7.5-8.5; and

Viscosity at working temperature of 32° C. of 10-20 cps.

Examples of suitable binder resins include, polyurethane dispersion (PUD), acrylic emulsion (AE), water-dispersible polyester (WDP), and carboxylic acid modified resins such as styrene-butadiene rubber (SBR) and acrylonitrile butadiene copolymer (NBR) latex.

Exemplary PUD and AE resins typically exhibit an acid number (mg KOH per gram acid) that ranges from 10-40. According to embodiments of the present invention, it is possible to use combinations of two or more binders, each or jointly having an acid value of more than 10.

The exemplary colored ink compositions used in the printing tests is presented in the tables below.

TABLE 1

| Component/Ingredient | Function | Amount by weight |
|---|---|---|
| Propylene Glycol | Humectant | 20-40% |
| Glycerin | Humectant | 5-15% |
| PRIMAL ECONEXT 230 (40%) | Acrylic binder emulsion acid No. 37 | 25-35% |
| ALBERDINGK ® U 475 | Polyester/PU binder | 5-10% |
| JONCRYL ® HPD 96 | Alkali-soluble agent | 2-5% |
| JONCRYL ® 538 | Acrylic emulsion acid No. 70 | 5-10% |
| White 60% $TiO_2$ | Pigment concentrate | 15-25% |
| ACTICIDE ® MBS | Fungicide/Bacteriocide | 0.3-0.5% |
| Triethylamine (TEA) | pH adjusting agent | 0.1% |
| De-ionized water | Carrier | to QS |

TABLE 2

| Component/Ingredient | Function | Amount by weight |
|---|---|---|
| Propylene Glycol | Humectant | 20-40% |
| Glycerin | Humectant | 5-15% |
| JONCRYL ® HPD 96 | Alkali-soluble agent | 2-5% |
| TAKELAC ™ WS-6021 | High acid number PU resin dispersion | 25-35% |
| White 60% $TiO_2$ | Pigment concentrate | 15-25% |
| ACTICIDE ® MBS | Fungicide/Bacteriocide | 0.3-0.5% |
| De-ionized water | Carrier | to QS |

In some experimental composition, good results were also obtained by using:

JONCRYL® 538, having high acid number, used as a pure acrylic emulsion;

JONCRYL® 538 combined with low acid value acrylic binder such as Stahl®'s AC-170 acrylic emulsion; and JONCRYL® 538 at 3-6% combined with Primal ECONEXT™ 230 acrylic-styrene emulsion used as main binder at 30-50%.

Example 2

Immobilizing Composition

In order to achieve curing at low temperatures and avoid dye migration, a polycarbodiimide LTCC used, which reacts with carboxylic groups found in the acrylic binders of the compatibly formulated ink composition, as well as in the polyester fabrics. In the context of embodiments of the preset invention, the crosslinking agent in placed in the immobilization composition, rather than in the ink composition, so as to avoid premature crosslinking and curing of the resins in the ink composition prior to printing. Low-temperature curing agents may react with species in the ink compositions while in the ink reservoir and/or printhead.

According to some embodiments of the invention, the polycarbodiimide may be selected from commercially available products, such as, for example, Carbodelite® V-10, Carbodelite® SW-12G, Carbodelite® E-05, Picassian® XL-701, Picassian® XL-702, Picassian® XL-725 and Picassian® XL-732, Carbodelite® E-02, Carbodilite® V-05 and Carbodelite® V-02-L2. According to some embodiments of the present invention, the LTCC agent is a polycarbodiimide crosslinking agent, with the proviso that the polycarbodiimide is not Carbodelite® E-02, Carbodilite® V-05 or Carbodelite® V-02-L2.

The immobilizing composition further includes, according to embodiments of the present invention, a transitory acid, namely an acid that is volatile or prone to decomposition to benign byproducts upon heating. Typically, the acid is a volatile acid such as acetic acid, or lactic acid that has a tendency to self-react under dehydrating conditions to form lactide, the cyclic di-ester of lactic acid, or glycolic acid that decomposes at the curing step. The acid is also selected so as not to react with the LTCC.

The immobilizing composition can be applied by a spray nozzle or a printhead, depending on the printing task or machinery. Spray mode application of immobilizing composition was carried out by spraying the liquid over the area which includes and extends beyond the area where the image was subsequently printed. Table 3 below presents a typical immobilizing composition, according to some embodiments of the present invention, suitable for spray nozzle application. Printhead mode application of immobilizing composition is carried out by digitally printing the liquid on a co-extensive area of the image that is subsequently printed. Table 4 below presents a typical immobilizing composition, according to some embodiments of the present invention, suitable for printhead application.

TABLE 3

| Component/Ingredient | Function | Amount by weight |
|---|---|---|
| Propylene Glycol | Humectant | 10-20% |
| Acetic acid | Property-adjusting agent (transitory acid) | 1-5% |
| Carbodiilite ™ V-10 or Carbodiilite ™ SW-12G | LTCC | 2-6% |
| De-ionized water | Carrier | to QS |
| pH | | 3-4 |

TABLE 4

| Component/Ingredient | Function | Amount by weight |
|---|---|---|
| Propylene Glycol | Humectant | 10-20% |
| Lactic acid or Glycolic acid | Property-adjusting agent (transitory acid) | 5-15% |
| Dynol ™ 360 | Surfactant | 0.5% |
| Carbodiilite ™ V-10 or Carbodiilite ™ SW-12G | LTCC | 10-20% |
| De-ionized water | Carrier | to QS |
| pH | | 3-4 |
| Viscosity | | 8-11 cps |

Example 3

Printing of Dyed Polyester Fabrics

According to embodiments of the present invention, low-temperature crosslinking at about 90-110° C. was utilized to effect curing of a white opaque film printed on top of the red, blue green or black dyed polyester substrate. The low-temperature curing step did not evoke dye migration yet achieved wash-fastness. The acid-induced coagulation of the white ink further assisted in forming a film on top of the substrate, minimizing infiltration (soaking) of the ink into the fabric.

When using a low-temperature curing crosslinking agent (LTCC) and curing the freshly printed image for 10-12 minutes at the low temperature of 100±5° C., according to embodiments of the present invention, a stable film being a binder-crosslinker-polyester fabric network was formed, showing no dye-migration. Post-process cure as room temperature continued for 3 days.

All printing tests were performed using Avalanche Hexa™ printer by Kornit Digital™ LTD, Israel.

Fabric substrate consisted of red, blue green or black dyed 100% polyester fabrics sold by Nike™, Proline™ and Promodoro™.

Curing was effected for 10-12 minutes at a temperature of 100±5° C. or 150±5° C. In general, crosslinking agents that require a temperature lower than 120±5° C. in order to cure are referred to herein as low-temperature curing crosslinking (LTCC) agents, and crosslinking agents that require a temperature higher than 120±5° C. in order to cure are referred to herein as high-temperature curing crosslinking (HTCC) agents.

Immobilizing composition was applied at a rate of about 0.05 grams per square centimeter (0.04-0.06 g/cm$^2$), using a spray nozzle. For the LTCC experiments the immobilizing composition comprised 10 wt % propylene glycol, 1.9% acetic acid and either no or 3.5 wt % LTCC (Carbodelite® V-10 by Nisshinbo Holdings Inc., Japan), in water to QS. For the HTCC experiments the immobilizing composition comprised 1.9% acetic acid and no crosslinking agent, in water to QS.

In the HTCC experiments the white ink composition comprised about 0.5-2 wt % of a self-crosslinking agent included in commercially available and widely used self-crosslinking acrylic resin emulsions, such as Primal ECONEXT™230 emulsion, which cures at a temperature higher than about 120° C., and optimally at higher than about 150° C.

Standard washing tests were conducted for all samples 72 hours after printing and curing the image thereon, using a Siemens washing machine loaded with 200 grams detergent, set to run five wash cycles at a 40° C., each of 60 minutes, and rinse spinning speed of 1000 rpm.

Dye migration was determined quantitatively by measuring the change in colorimetric parameters L*, a*, b* (color intensity measurements), over a time period of at least 1 week over—which the sample is kept at room temperature. Quantitative dye migration employed an i1Basic Pro 2 colorimeter by X-Rite, U.S.A, applied manually on the surface of the printed fabric. Briefly, the CIE L*, a*, b* color scale is an approximately uniform color scale, wherein the differences between sampled points, plotted in the 3-dimensional color space correspond to visual differences between the sampled colors. The CIE L*, a*, b* color space is organized in a Cartesian coordinate system, wherein L* axis runs from top +100 to bottom −100, each representing a perfect reflecting diffuser while the minimum for L* is zero, representing black. The a* and b* axes have no specific numerical limits, wherein positive a* is red, negative a* is green, positive b* is yellow and negative b* is blue. The total color difference, ΔE*, is a single value which takes into account the differences between the L*, a* and b* of the sample and the standard, but it does not indicate which parameter is out of tolerances. In some cases where one or more of ΔL*, Aa* or Ab* is out of tolerance, ΔE* may still be within tolerance.

For example, while printing an opaque white image over a red dyed polyester, the a* value was measured on the white surface of the image printed on top of the red dyed polyester shirt to measure migrant red color, whereas this value should be as low as possible after curing (about 2-6 unit) and should not change after 1 weak (ΔE* <1 unit is regarded as passing the dye migration test).

Table 5 present the results of a printing experiments using red, blue green or black dyed polyester fabric having a continuous white film (an image), printed at a rate of 0.018 g/cm$^2$ directly on the wet substrate, being wet from the immobilizing composition, and cured thereon at 100±5° C., according to some embodiments of the present invention, containing low-temperature curing polycarbodiimide crosslinking agent (3.5 wt % Carbodelite® V-10).

TABLE 5

| Polyester fabric substrate | T ±5° C. | LTCC | HTCC | Dye Migration test | Wash fastness test score (1-5; fail to pass) |
|---|---|---|---|---|---|
| 1. Proline red | 100 | + | 0 | Pass | 5; best pass |
| 2. Proline red | 150 | 0 | + | ΔE* > 25; Fail | 5; best pass |
| 3. Proline red | 100 | 0 | 0 | Pass | 1; worse failed |
| 4. Proline red | 100 | 0 | + | Pass | 1; worse failed |
| 5. Proline black | 100 | + | 0 | Pass | 5; best pass |
| 6. Proline black | 100 | 0 | 0 | Pass | 1; worse failed |
| 7. Nike red | 150 | 0 | + | ΔE* > 25; Fail | 5; best pass |
| 8. Nike red | 100 | 0 | + | Pass | 1; worse failed |
| 9. Nike blue | 100 | + | 0 | Pass | 5; best pass |
| 10. Nike blue | 100 | 0 | 0 | Pass | 1; worse failed |
| 11. Nike green | 100 | + | 0 | Pass | 5; best pass |
| 12. Nike green | 100 | 0 | 0 | Pass | 1; worse failed |
| 13. Proline red | 150 | + | 0 | ΔE* > 25; Fail | 5; best pass |

As can be seen in Table 5, curing of the image film is crucial for wash-fastness, therefore print samples, which either had no crosslinking agent (samples 3, 6, 10 and 12) or had an HTCC heated to a low temperature of 100° C. (samples 4 and 8), failed the wash fastness test (peeled off completely during the standard washing test after only 2 cycles). As can further be seen in Table 5, samples that were cured at a temperature higher than about 120° C. suffered from dye migration, regardless of which crosslinking agent was used, as evident in samples 2, 7 and 13. The only samples that passed both the dye migration test and the wash-fastness test were those formed by applying the immobilization composition includes the LTCC, according to embodiments of the present invention, and cured at about 100° C.

Table 6 the results of a printing experiments using red dyed polyester fabric substrate having a white image printed and cured thereon at RT, 100° C. or 150° C. using 3.5 wt % polycarbodiimide LTCC (Carbodelite® V-10). Dye migration was measured quantitatively by color intensity measurements conducted on the top side of a white image printed on the dyed substrate a week after the image has been printed and kept at room temperature, as discussed above.

TABLE 6

| Curing Temp. | Curing Time | Image discoloration before wash | | | Image discoloration after wash | | | | Dye migration test | Wash fastness test |
| --- | --- | --- | --- | --- | --- | --- | --- | --- | --- | --- |
| | | L* | a* | b* | L* | a* | b* | ΔE* | | |
| RT | Over night | 90 | 5.5 | 1.8 | NA | NA | NA | NA | NA | Fail; peeled off |
| RT | 7 days | 92 | 4.8 | −0.8 | NA | NA | NA | NA | NA | Fail; peeled off |
| 100° C. | 12 min + 3 days at RT | 93 | 6.4 | 1.2 | 91 | 6.7 | 1.5 | ≤1 | pass | Pass |
| 100° C. | 12 min + 3 days at RT | 92 | 4 | −1 | 90.6 | 4.3 | −0.5 | ≤1 | pass | Pass |
| 150° C. | 12 min | 93 | 6.4 | 1.2 | 85 | 25 | 1.5 | 20.2 | fail | Pass |
| 150° C. | 12 min | 92 | 4 | −1 | 86 | 32 | −0.5 | 28.6 | fail | Pass |

As can be seen in the Table 6, the white image printed on red-dyed polyester fabrics using a LTCC and left to cure at room temperature did not form the necessary bonding with the substrate, as evident from failing the wash fastness test, while the images that have been cured at 100° C. or 150° C. did form the required bonding. As can further be seen in Table 6, the images that were cured at 100° C. exhibited no discoloration, indicating that dye migration did not occur, while the images cured on the red dyed polyester fabrics at 150° C. exhibited visible and measurable image discoloration caused by dye migration.

Example 4

Ink Resin Effect

In the context of the present invention, achieving immobilization of the printed ink droplets prior to curing the ink into a film, contributes to the film coalescence and formation, which in turn facilitates crosslinking of the film to the substrate. The beneficial effect of immobilizing the ink droplets by coagulation, resulting from acid-base interaction between an acid in the immobilizing composition and the ink composition once in contact on the substrate, has been shown elsewhere.

The successful use of a LTCC for low-temperature curing of a printed image film on dyed synthetic fabrics requires adaptation of the counterpart color-bearing ink composition, and particularly the acrylate polymer and/or urethane polymer emulsions component thereof. The acidic environment (low pH) contributes to faster crosslinking by accelerating the reaction between the LTCC and the carboxylic groups on ingredients in the ink composition, primarily with the high acid number resin emulsified therein.

In this example, the effect of the acid number of the acrylic emulsion component in the ink composition on wash fastness, has been studied in the context of using a low-temperature curing crosslinking agents for printing white images on dyed polyester fabric samples. Emulsions of various acrylic resins having a range of acid number values, which included the non-limiting examples of Stahl® AC-170 acrylic emulsion (acid No. value of 7), Primal ECONEXT 230 (acid No. value of 37) and JONCRYL® 538 (acid No. value of 70), have been used comparatively for printing and curing at 100±5° C. a white film on a red-dyed polyester fabric substrate using an aqueous immobilization composition includes acetic acid (1.9 wt. %) and a polycarbodiimide LTCC (3.5 wt. % Carbodelite® V-10), and the results are presented in Table 7.

TABLE 7

| Acrylic resin contents in ink composition | Wash fastness test score (1-5; fail to pass) | Dye migration test |
| --- | --- | --- |
| 35 wt % Econext 230 (acid No. 37) and 3 wt % JONCRYL ® 538 (acid No. 70) | 5 | pass |
| 38 wt % AC-170 (acid No. 7) | 1 | pass |
| 35 wt % AC-170 (acid No. 7) and 3 wt % JONCRYL ® 538 (acid No. 70) | 4 | pass |

As can be seen in Table 7, acrylic resins having a low acid number (lower than 10), such as AC-170, did not react/crosslink at 100° C. with a LTCC, and thus the resulting film did not adhere to the substrate, resulting in a wash fastness score of 1 (all printed film samples peeled off). Essentially the same ink composition, differing only in the acrylic resin composition emulsified therein having a higher acid number, afforded by substituting 3-5% of the low acid number resin AC-170 with a high acid number acrylic resin JONCRYL® 538 (acid number of 70), improved the wash fastness score from 1 to 4.

Chemical properties of various resins and adhesion promoting agents in the ink composition can be studied to establish their effect on wash fastness and dye migration when used in the context of low temperature curing for printing white images on dyed polyester fabrics in conjunction with applying to the substrate immobilizing compositions include LTCC. The study is conducted using a fixed set of ink composition ingredients and a series of commercially available resin products suitable for use in inkjet ink compositions, and having a variety of chemical and structural features, such as acid number, type and density of reactive pendant groups, cap (end) groups, branching and the like. Acrylic resins and polyurethane resins and co-polymer of the foregoing, and mixtures of acrylic resins and polyurethane resins, and low acid value acrylic resins and high acid value acrylic resins, can be tested for suitability as counterpart reactants for the LTCC agent in the immobilizing composition.

Resins suitable as counterpart reactants for the LTCC agent include, without limitation, Joncryl Flx 5025/5026 (40%; acid number 6), Takelac W-5661 (35%; polyurethane resin), Takelac W-6110 (32%; polyurethane resin), Takelac W-6355 (34-36%; polyurethane resin), Takelac W-6061 (30%; polyurethane resin), Takelac WS-6021 (30%; polyurethane resin) and Joncryl Flx 5010 (40%; acid number 7). The fixed set of ingredient may include, 23-26% pigment concentrate such as "Paste 1002/4 b: 9283 or "VMA (40%)", propylene glycol (PG, 20-30%), monoethylene glycol (MEG, 4-5%), surfactant such as BYK 348 (0.05-1%), pH adjusting agent such as triethylamine (TEA, 0.05-1%), a fungicide/bactericide such as ACTICIDE® MBS (0.05-1%), and deionized water to QS. The tests may include the effect of curing at 100±5° C. or 150±5° C. for 10 minutes on dye migration (following ΔE* values) and wash fastness (standard wash test), and other standard test known in the art.

The ink compositions containing foregoing resins having a high acid number will be compared to standard ink compositions containing relatively low acid number resins by dye migration and wash fastness. Standard ink compositions typically include less than 10% reactive resins, such as high molecular weight methacrylic acid/benzyl methacrylate/ethyltriethyeneglycol methacrylate block copolymer, neutralized to pH 7-8 with potassium hydroxide; or phenoxyethyl acrylate-g-ethoxy-triethyleneglycol methacrylate-co-methacrylic acid graft copolymer, neutralized to pH 7-8 by N,N-dimethylethanolamine; or surface modified self-dispersible pigments modified with grafted carboxylate groups; or acrylic latex; or Witcobond W213 cationic polyurethane; and the likes.

Ink composition, such as those used in U.S. Pat. No. 7,425,062, are compared to ink composition includes reactive resins according to embodiments of the present invention, particularly when cured at the temperature specified therein and at 100±5° C.

It is expected that compared to standard ink compositions containing relatively low acid number resins, the ink compositions containing the foregoing resins having a high acid number, according to embodiments of the present invention, will have a more efficient crosslinking at the relative low temperature of 100±5° C., and exhibit higher wash fastness, and all that while showing no significant visible signs of dye migration.

Example 5

Polycarbodiimide Effect

The chemical properties of various polycarbodiimide crosslinking agent was studied to establish their effect on wash fastness and dye migration when used as LTCC in immobilizing compositions, according to embodiments of the present invention, for printing white images on dyed polyester fabrics.

To represent a variety of polycarbodiimide crosslinking agent, the following Nisshinbo® water soluble, oil-in-water emulsion or water dispersible with soap/dispersant LTCCs are commercially available:

Carbodelite® E-02 (U.S. Pat. No. 7,134,749) provided as a soap-free emulsion having long pot life;

Carbodilite® V-05 (U.S. Pat. No. 7,134,749);

Carbodelite® V-02-L2 (U.S. Pat. No. 7,134,749) provided as an aqueous solution having long pot life;

Carbodelite® V-10;

Carbodelite® SW-12G provided in an aqueous solution containing DPM;

Carbodelite® E-05 characterized as a dispersion (with soap) having extra-long pot life and low reactivity;

SV-02 water emulsion, characterized as high crosslink density;

XL-701 (50% solids) solvent based MPA;

XL-702 (40%) water emulsion; and

XL-732 (40%) water based.

The macroscopic properties of these LTCCs are summarized in Table 8 below, wherein carbodiimide (—NCN—) equivalent represents reactivity expressed as chemical formula weight per 1 mole of carbodiimide group.

TABLE 8

| | Carbodilite ® | | | | | | |
| --- | --- | --- | --- | --- | --- | --- | --- |
| | E-02 | V-05 | V-02-L2 | V-10 | SW-12G | SV-02 | E-05 |
| Waterborne | Emulsion | No longer available | Solution | Solution | Solution of DPM and water | Water solution | Emulsion |
| pH | 8~11 | — | 8~11 | 9~12 | 10-12 | 8-11 | 8-11.5 |
| Carbodiimide equivalent | 445 | — | 385 | 410 | 465 | 430 | 310 |

Additional commercially available LTCC include Stahl products such as:

Picassian XL-725;

Picassian XL-732; and

Picassian XL-702.

Table 9 presents results of using some Nisshinbo® LTCCs marketed under the trade name Carbodilite®, wherein each of the LTCC was applied at a concentration of 3.5% on a red 100% polyester substrate (Nike™ shirt), as part of an acidic immobilizing composition includes 1.7% acetic acid (pH 4). The ink composition that was printed on the area wetted with the immobilizing composition contained a resin mixture includes Primal Econext 230 (40%; acid No. 37) and Joncryl 538 (46.5%; acid No. 70), and a white pigment, adjusted to a pH of 7.4-8.4. The printed image film was subsequently cured at 100±5° C. for 10 minutes, and the results are provided in the form of test scores afforded by the foregoing dye migration test (ΔE<1 pass; ΔE>>1 fail) and wash fastness test (1-5; 1 worse; 5 best).

TABLE 9

|  | Carbodilite ® | | | | |
|---|---|---|---|---|---|
|  | V-05 | V-02-L2 | V-10 | SW-12G | E-05 |
| Dye migration | Pass | Pass | Pass | Pass | Pass |
| Wash fastness | 5 | 5 | 5 | 5 | 5 |

It is assumed that the LTCC Carbodelite® SW-12G (provided in an aqueous solution containing the glycol ether DPM) reacted faster and resulted in higher crosslinking density compared to Carbodelite® V-10 (provided in neat water). This assumption was based on wash fastness results while printing on a non-absorbent cotton fabric. The results for Carbodelite® E-05 and Carbodelite® V-02-L2, both provided without a glycol ether, as in the case of Carbodelite® V-10, were very similar to the results obtained with Carbodelite® V-10. It is assumed that the presence of a glycol ether facilitates the availability of the carboxylic groups in the resin to react with the LTCC, since it may loosen the polymeric chains of the resin, making its carboxylic groups more exposed and thus more reactive in the crosslinking reaction.

The effect of a series of LTCCs, according to embodiments of the present invention, used in immobilization compositions include an acid, is compared to the effectiveness of the first ink compositions described in U.S. Pat. No. 7,425,062, namely the effectiveness of using the pCDI species or carbodiimide groups-containing components described therein in a non-acidified composition. The effectiveness of these compositions will be tested when used to print a white image on a dyed synthetic substrate cured at the temperature specified in U.S. Pat. No. 7,425,062, and at 100±5° C.

It is expected that compared to the first ink compositions containing the pCDI species of U.S. Pat. No. 7,425,062, the ink compositions containing the LTCC according to embodiments of the present invention, will have a more efficient crosslinking at the relative low temperature of 100±5° C., and exhibit higher wash fastness, and all that while showing no significant visible signs of dye migration.

Example 6

Acid-Driven Immobilization

The effect of the pH of the immobilizing composition includes an LTCC, according to some embodiments of the present invention, was tested comparatively with corresponding compositions have the same ingredients except for their pH levels.

For this tests, three LTCC-containing compositions have been prepared using 3.5% Carbodelite® V-10 as LTCC, and used to wet a red polyester substrate prior to printing a double layer resolution 400×600 white image thereon, and their contents is presented in Table 10 below. Table 10 also presents the colorimetric measurement results for the white image, wherein the lack of white ink immobilization in the samples printed over neutral and alkaline LTCC composition, is expected to manifest itself by ink penetration into the red polyester substrate, lowering the L* parameter in the L*a*b* color scale, and increasing the a* and b* parameters due to showing of the background through the white layer.

TABLE 10

|  | Acidic LTCC composition (exemplary immobilizing composition) | Neutral LTCC composition | Alkaline LTCC composition |
|---|---|---|---|
| pH | 4.5 | 7 | 9.5 |
| Acetic acid | 1.7% | 0.005% | — |
| L*a*b* | 93.4, 6, 2.7 | 40, 53, 20 | 40, 49, 17.9 |

As can be seen in Table 10, the white image printed on the red polyester substrate wet from the LTCC-containing acidic immobilizing composition resulted in a sharp white image having a high L* value, indicating no loss of color due to ink soaking or mixing is observed. In contrast, the white images printed on the red polyester substrate wet from the LTCC-containing neutral or alkaline compositions exhibited low L* value (40) and high a* (red) values, which are expected when the ink soaks and spreads in and over the red-colored substrate.

FIG. 1 presents a comparative plot of reflectance measured by a colorimeter wavelength scan in the visible light range, obtained from a sample of a white image printed on a red polyester fabric using acidic immobilizing composition that includes a LTCC according to embodiments of the present invention (line No. 1), a neutral LTCC composition (line No. 2), and an alkaline (pH>9) LTCC composition (line No. 3).

As can be seen in FIG. 1, the color reflectance plot of the white ink surface using the acidic LTCC solution is high (line No. 1 in FIG. 1), meaning that immobilization and crosslinking of the ink layer is feasible and occurs effectively and efficiently, compared to the neutral and basic compositions (line Nos. 2 and 3 in FIG. 1, respectively); curing and intra-crosslinking of the ink layer and crosslinking between the ink and the polyester fabric while using a neutral or high pH LTCC solutions is not efficient since no immobilization in the ink takes place, and the ink layer is not sufficiently stable for crosslinking internally and/or the substrate.

Example 7

Self-Crosslinking Resin

The use of a self-crosslinking resin as the LTCC, forming a part of the ink composition, was tested and demonstrated below. For this test, the urethane elastomer dispersion TAKELAC™ WS-6021 was used. This product, typically used for coating and paints, is characterized by a low $T_g$ and a low crosslinking temperature below 100° C., average particle diameter of 90 nm, high flexibility and elongation (low $T_g$), colorless (transparent), good adhesion to PET, stain and water resistance, and high reactivity with external carbodiimide/blocked isocyanate moieties and crosslinkers.

This LTCC was incorporated into the white underbase ink composition and the other colored ink composition, namely cyan, magenta, yellow and black ink compositions, as demonstrated in the exemplary PM 700 series ink compositions presented below. The immobilizing compositions used was similar to those shown in Table 3 and Table 4, but without a LTCC incorporated therein.

TABLE 11

| White ink composition | Effective Wt. % range | Exemplary Wt. % |
| --- | --- | --- |
| PG | 10-30 | 20.95 |
| MEG | 0.5-5 | 3.32 |
| BYK 348 | 0-0.5 | 0.1 |
| Takelac WS-6021 (30%) | 20-70 | 52.4 |
| Di water | 0.5-4 | 2.1 |
| Acticide MBS | 0-0.1 | 0.09 |
| TEA | 0.-0.4 | 0.09 |
| P3 A (50%) pasta formula | 10-35 | 20.95 |
| Total | | 100 |

TABLE 12

| P3 A - Pasta Formula for White | Effective Wt. % range | Exemplary Wt. % |
| --- | --- | --- |
| PG | 1-10 | 4 |
| DI water | 5-20 | 9 |
| Hydrophilic silica Aerodisp G1220 (20%) | 10-30 | 23.5 |
| Ionic dispersant Dispex Ultra PX 4575 (40%) | 10-20 | 13.3 |
| Anti foamer Foamex 810 (100%) | 0.0-0.5 | 0.2 |
| Rutile KRONOS 2310 (100%) | 25-70 | 50 |
| Total | | 100 |

TABLE 13

| Cyan ink composition | Effective Wt. % range | Exemplary Wt. % |
| --- | --- | --- |
| PG | 20-40 | 33 |
| MEG | 10-20 | 13 |
| TEA | 0.0-1 | 0.4 |
| Byketol PC | 2-8 | 4 |
| Takelac WS-6021 (30%) | 20-50 | 33 |
| DI Water | 10-20 | 13 |
| Acticide MBS | 0.0-0.1 | 0.09 |
| DynWet 800 | 0.0-1.0 | 0.5 |
| Hostajet C (20%) | 2-8 | 3 |
| Total | | 100 |
| S.T (mN/m) | | 37.93 |
| pH | | 9.51 |
| Density (gr/cm³) | | 1.05 |
| Viscosity (cP) - High sheer | | 15.1 |
| Z Number | | 2.5 |

TABLE 14

| Magenta ink composition | Effective Wt. % range | Exemplary Wt. % |
| --- | --- | --- |
| PG | 20-30 | 25.8 |
| MEG | 10-20 | 16.2 |
| TEA | 0.1-1 | 0.4 |
| Byketol PC | 2-8 | 4 |
| Takelac WS-6021 (30%) | 20-50 | 32 |
| DI Water | 10-20 | 13 |
| Acticide MBS | 0.0-0.1 | 0.09 |
| DynWet 800 | 0.1-0.8 | 0.5 |
| Hostajet M (20%) | 5-15 | 8 |
| Total | | 100 |
| S.T (mN/m) | | 38.07 |
| pH | | 9.45 |
| Density (gr/cm³) | | 1.05 |
| Viscosity (cP) - High sheer | | 15.2 |
| Z Number | | 2.5 |

TABLE 15

| Yellow ink composition (PM 700) | Effective Wt. % range | Exemplary Wt. % |
| --- | --- | --- |
| PG | 15-30 | 22 |
| MEG | 10-20 | 12 |
| TEA | 0.1-0.5 | 0.3 |
| Byketol PC | 2-8 | 4 |
| Takelac WS-6021 (30%) | 20-50 | 32 |
| PVP Mw 40 ex. Sigma + water (39%) | 1-5 | 2 |
| DI Water | 10-20 | 15.21 |
| Acticide MBS | 0.0-1 | 0.09 |
| DynWet 800 | 0-1 | 0.4 |
| Hostajet Y (15%) | 10-20 | 12 |
| Total | | 100 |
| S.T (mN/m) | | 38.13 |
| pH | | 9.04 |
| Density (gr/cm³) | | 1.05 |
| Viscosity (cP) - High sheer | | 14.1 |
| Z Number | | 2.7 |

TABLE 16

| Black ink composition (PM 700) | Effective Wt. % range | Exemplary Wt. % |
| --- | --- | --- |
| PG | 15-30 | 21.78 |
| MEG | 5-20 | 11.88 |
| TEA | 0.1-1 | 0.3 |
| Byketol PC | 2-8 | 3.96 |
| Takelac WS-6021 (30%) | 20-50 | 31.69 |
| DI Water | 5-15 | 9.8 |
| Acticide MBS | 0-0.1 | 0.09 |
| DynWet 800 | 0.1-0.8 | 0.40 |
| Hostajet C (20%) | 2-10 | 5.25 |
| Hostajet K (20%) | 5-20 | 2.87 |
| Total | | 100 |
| S.T (mN/m) | | 39.27 |
| pH | | 9.24 |
| Density (gr/cm³) | | 1.05 |
| Viscosity (cP) - High sheer | | 14.4 |
| Z Number | | 2.7 |

The results of ink color quality (Lab values) before and after wash fastness test, as measured on a colored rectangle image printed on dyed synthetic fabrics, are presented in Table 17 below.

TABLE 17

|  | white | red | yellow | green | purple | blue | pale blue | black |
|---|---|---|---|---|---|---|---|---|
| Black Taiwan PE | | | | | | | | |
| L | 88.1 | 46.5 | 79.6 | 63.0 | 39.0 | 32.6 | 73.9 | 27.2 |
| a | 0.6– | 45.1 | 6.2– | 34.3– | 51.9 | 11.0 | 16.8– | 0.0 |
| b | 0.0 | 19.5 | 75.7 | 38.9 | 19.9– | 39.1– | 1.9 | 0.8– |
| L wash | 84.8 | 39.3 | 76.1 | 60.5 | 40.3 | 27.7 | 71.4 | 23.2 |
| a wash | 1.6 | 51.5 | 3.8– | 31.2– | 50.5 | 12.1 | 13.7– | 0.0 |
| b wash | 2.6 | 23.5 | 70.6 | 37.0 | 16.7– | 40.6– | 3.9 | 1.2– |
| Delta | 4.7 | 10.4 | 6.6 | 4.4 | 3.7 | 5.2 | 4.5 | 4.0 |
| Green Taiwan PE | | | | | | | | |
| L | 90.2 | 41.6 | 84.3 | 65.4 | 40.2 | 29.1 | 75.9 | 26.2 |
| a | 4.5– | 54.5 | 10.7– | 40.1– | 53.1 | 12.7 | 22.1– | 1.0– |
| b | 1.3– | 27.7 | 85.8 | 41.9 | 21.6– | 46.3– | 2.7 | 0.5– |
| L wash | 85.1 | 40.8 | 78.0 | 63.3 | 41.2 | 30.1 | 73.0 | 26.4 |
| a wash | 1.0– | 50.9 | 6.1– | 33.1– | 48.4 | 9.9 | 16.1– | 2.0– |
| b wash | 2.2 | 23.7 | 74.2 | 35.7 | 17.1– | 38.8– | 3.4 | 0.1 |
| Delta | 7.1 | 5.4 | 14.0 | 9.6 | 6.6 | 8.1 | 6.7 | 1.2 |
| Black dry fit PE | | | | | | | | |
| L | 88.5 | 42.3 | 79.7 | 62.5 | 39.9 | 30.0 | 72.5 | 24.5 |
| a | 1.1– | 52.2 | 7.4– | 37.2– | 51.0 | 11.8 | 17.2– | 0.2 |
| b | 0.8– | 25.8 | 79.3 | 41.1 | 19.5– | 40.4– | 1.0 | 1.0– |
| L wash | 83.3 | 38.9 | 75.8 | 60.3 | 38.5 | 29.2 | 69.8 | 24.4 |
| a wash | 0.9 | 48.4 | 4.1– | 31.1– | 49.9 | 9.7 | 14.4– | 0.4 |
| b wash | 2.4 | 22.2 | 72.7 | 37.1 | 16.4– | 37.2– | 3.2 | 0.8– |
| Delta | 6.4 | 6.2 | 8.3 | 7.6 | 3.6 | 3.9 | 4.5 | 0.3 |

As can be seen in Table 17, the color values of the inks indicate that the dye in the substrate did not infiltrate the printed film, and the wash fastness of the images was not impaired by the self-crosslinking resin.

In addition, white image, printed at a layer thickness of 4×100% coverage on a red 100% polyester fabric, using the above white ink composition cured at 100° C., exhibited L*=94, a*=5, and b*=0.8 after drying (curing), and L*=93.5, a*=6, and b*=0.84 after four months, indicating that the highly migratable red dye did not infiltrate the white image even after a long period of time.

As can be seen in the results presented herein, the cured film, forming the image printed on the dyed substrate, is essentially devoid of significant signs of dye migration from the dyed substrate therein.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A process for digital inkjet printing color images directly on a dyed substrate, the process comprising:
    digitally printing by an inkjet printhead directly on at least a portion of the substrate an immobilizing composition that comprises an acid and an aqueous carrier, and formulated to exhibit an acidic pH lower than 7;
    digitally printing by an inkjet printhead directly on said portion of the substrate an ink composition that comprises a dispersed pigment, a low-temperature curing self-crosslinking resin and an aqueous carrier, and formulated to exhibit an alkaline pH higher than 7; and
    curing the printed substrate to thereby initiate a crosslinking reaction and form the image in the form of a film on the surface of the substrate, wherein:
    the dyed substrate is a fabric made of synthetic fibers;
    the dyed substrate is dyed with a dye that migrate at a temperature higher than 120° C.;
    said low-temperature curing self-crosslinking resin is a pH-sensitive low-temperature curing self-crosslinking resin;
    said low-temperature curing self-crosslinking resin initiates crosslinking reaction at a temperature that ranges from 90° C. to 110° C.;
    said low-temperature curing self-crosslinking resin is a polycarbodiimides; and
    said curing is effected by heating the printed substrate at a temperature lower than 110±5° C. for 10-12 minutes followed by 3 days at room temperature.

2. The process of claim 1, further comprising, subsequent to said heating, maintaining said substrate having the printed thereon at a temperature lower than 100° C. for a time period that ranges from 1 hour to 1 week to thereby effect propagation of said crosslinking reaction.

3. A dyed substrate having an image printed thereon in a form of a cured film, wherein the image is afforded by the process of claim 1.

4. An image in a form of a cured film applied on a dyed substrate, wherein the image is afforded by the process of claim 1.

* * * * *